United States Patent
Kuroda et al.

(10) Patent No.: US 7,602,566 B2
(45) Date of Patent: Oct. 13, 2009

(54) MAGNETIC TRANSFER MASTER AND METHOD OF FORMATTING MAGNETIC RECORDING MEDIUM

(75) Inventors: Sumio Kuroda, Kawasaki (JP); Kazuyuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 10/930,413

(22) Filed: Aug. 31, 2004

(65) Prior Publication Data
US 2005/0243453 A1    Nov. 3, 2005

(30) Foreign Application Priority Data
Apr. 30, 2004   (JP)   ............... 2004-135797

(51) Int. Cl.
*G11B 5/86* (2006.01)
(52) U.S. Cl. ...................................... 360/17
(58) Field of Classification Search ............. None
See application file for complete search history.

(56) References Cited

U.S. PATENT DOCUMENTS 6,347,016 B1 *  2/2002  Ishida et al. ............ 360/17
2002/0131199 A1   9/2002  Takeo .................. 360/97.01
2003/0008099 A1   1/2003  Nishikawa et al. ....... 428/65.3
2003/0123170 A1*  7/2003  Miyata et al. ............ 360/17
2004/0264024 A1* 12/2004  Yasunaga ............... 360/31

FOREIGN PATENT DOCUMENTS

| EP | 0 915 456 | 5/1999 |
|----|-----------|--------|
| JP | 10-320768 | 12/1998 |
| JP | 2002-230734 | 8/2002 |
| JP | 2003-173513 | 6/2003 |

* cited by examiner

*Primary Examiner*—Joseph H Feild
*Assistant Examiner*—Daniell L Negrón
(74) *Attorney, Agent, or Firm*—Greer, Burns & Crain, Ltd.

(57) ABSTRACT

A master is used for writing information to a magnetic recording disk by a magnetic transfer method. The recording disk includes a magnetic recording layer possessing vertical magnetic anisotropy. The master includes a servo zone corresponding part formed with a magnetic material pattern for recording servo information to the recording layer of the recording disk. The master also includes a user data zone corresponding part formed with a second magnetic material pattern for providing the recording layer of the recording disk with a dummy signal.

6 Claims, 23 Drawing Sheets

MAGNETIC TRANSFER MASTER AND METHOD OF FORMATTING MAGNETIC RECORDING MEDIUM

BACKGROUND OF THE INVENTION

1. Field of the Invention

The present invention relates to a patterned master medium ("master") that is used to write servo information by a magnetic transfer method (magnetic contact duplication) to a vertical magnetic recording medium. The present invention also relates to a method for formatting a vertical magnetic recording medium by using such a magnetic transfer method.

2. Description of the Related Art

As information processing volumes of computer systems increase, magnetic recording media constituting storage devices such as hard disks are confronted by demands for an increased storage capacity. Vertical magnetic recording-type magnetic recording media have attracted attention in recent years as media capable of fulfilling such demands.

FIGS. 29 and 30 show a magnetic disk 200, which is an example of a vertical magnetic recording-type magnetic recording medium. FIG. 29 is a plan view of the constitution of the recording face of the magnetic disk 200, and FIG. 30 shows the laminated constitution of the magnetic disk 200.

As shown in FIG. 30, the magnetic disk 200 has a laminated structure that consists of a substrate 201, a magnetic recording layer 202, a soft magnetic layer 203, an intermediate layer 204, and a protective film 205. The magnetic recording layer 202 is a vertical magnetization film, and allows a predetermined signal to be recorded as a change in the magnetization direction. Such a magnetic recording layer 202 constitutes the recording face of the magnetic disk 200. The soft magnetic layer 203 consists of a soft magnetic material. The intermediate layer 204 consists of a nonmagnetic material and magnetically separates the magnetic recording layer 202 and soft magnetic layer 203. The protective film 205 physically and chemically protects the magnetic recording layer 202 from the external environment while securing a lubricating ability for the medium surface with respect to a record/playback magnetic head.

A plurality of concentric information tracks 210 as shown in FIG. 29 (partially omitted) are magnetically constituted in the magnetic recording layer 202 that constitutes the recording face of the magnetic disk 200. The magnetic recording layer 202 is divided into servo zones 202A and user data zones 202B in the direction of extension of the film face. The servo zones 202A are areas in which predetermined servo information for controlling the alignment of the record/playback magnetic head with the magnetic disk 200 with respect to a target information track 210 is recorded. The user data zone 202B is a part that allows user data to be recorded in respective information tracks 210 such that the user data can be rewritten.

In the fabrication of a magnetic disk 200 of this kind, the soft magnetic layer 203, intermediate layer 204, magnetic recording layer 202, and protective film 205 are first sequentially formed on the substrate 201. Each of these layers and film is formed by depositing a predetermined material by sputtering, for example. Next, servo information is recorded in the magnetic recording layer 202 to form the servo zones 202A.

The magnetic transfer method is known as one procedure for recording servo information. FIG. 31 shows a series of steps in a case where servo information is recorded by a conventional magnetic transfer method in the process of fabricating the magnetic disk 200. In this method, as shown in FIG. 31A, initial magnetization of the magnetic recording layer 202 of the magnetic disk 200 is first performed. More specifically, by applying an initial magnetization magnetic field H1 in a predetermined direction, the magnetization direction of the magnetic recording layer 202 can be kept uniform. With a view to simplifying the illustration, layers and films of the magnetic disk 200 other than the substrate 201 and magnetic recording layer 202 are omitted from FIG. 31. Next, as shown in FIG. 31B, a magnetic transfer master 300 and the magnetic disk 200 are overlapped. The master 300 comprises a substrate 301, and a magnetic material pattern 302 formed as a pattern on the substrate 301. The magnetic material pattern 302 consists of a soft magnetic material, for example, that has high magnetic permeability. Further, the magnetic material pattern 302 has a pattern shape that corresponds with desired servo information that is to be recorded in the magnetic recording layer 202 of the magnetic disk 200. Next, as shown in FIG. 31C, the pattern shape of the magnetic material pattern 302 is transferred magnetically to the magnetic recording layer 202. More specifically, by applying a transfer magnetic field H2 in a direction that is the reverse of the above initial magnetization magnetic field H1 to the master 300 and magnetic disk 200, the magnetization direction at points in the magnetic recording layer 202 that face the magnetic material pattern 302 is reversed. Therefore, servo information is recorded in the magnetic recording layer 202 to form the servo zones 202A. Conventional magnetic transfer methods are described in Japanese Patent Application Laid Open Nos. H10-320768 and 2003-173513, for example.

After the servo zones 202A have been formed, with servo information recorded, user data can be recorded on the magnetic disk 200. More specifically, while the alignment of a predetermined magnetic head comprising a write head element is controlled with respect to the recording face of the magnetic disk 200 (magnetic recording layer 202) by using the servo information, predetermined data can be recorded in the user data zones 202B between the servo zones 202A by the magnetic head.

When information tracks 210 are formed by recording user data in the user data zones 202B of the magnetic disk 200 where servo information has been written by the above conventional magnetic transfer method, intertrack portions 211, in which the magnetization direction is kept uniform, are produced in the user data zones 202B as shown in FIG. 32. FIG. 32 shows a partial cross-section of the magnetic disk 200 in the radial direction of the magnetic disk 200, that is, in a direction that transects the information tracks 210. Between the respective information tracks 210 constituted by user data, the magnetization direction of the magnetic recording layer 202 is kept in the direction of the initial magnetization of the above magnetic transfer method. Because the intertrack portions 211 are magnetized uniformly in the initial magnetization direction, a comparatively strong magnetic field that originates in the intertrack portions 211 is formed near the surface of the medium. When the magnetic disk 200 is played back, the magnetic field acts on the record/playback magnetic head RW as a non-signal magnetic field (disturbance magnetic field) and affects the reading operation of the magnetic head RW. More specifically, the non-signal magnetic field that originates in the intertrack portions 211 acts on the read head element for reading that is mounted on the magnetic head RW and affects the playback signal outputted by the read head element. Because the non-signal magnetic field thus originating in the intertrack portions 211 is strong, it is difficult to obtain a favorable playback characteristic for the magnetic disk 200.

SUMMARY OF THE INVENTION

The present invention has been proposed under the circumstances described above. It is, therefore, an object of the present invention to provide a magnetic transfer master and a method for formatting a magnetic recording medium that are suitable for the fabrication of a vertical magnetic recording medium with a subdued non-signal magnetic field that acts on a read head element during playback.

According to a first aspect of the present invention, there is provided a master for writing information to a magnetic recording medium by a magnetic transfer method, the recording medium including a magnetic recording layer that possesses vertical magnetic anisotropy. The master comprises: a servo zone corresponding part formed with a first magnetic material pattern for recording servo information to the magnetic recording layer; and a user data zone corresponding part formed with a second magnetic material pattern for providing the magnetic recording layer with a dummy signal.

Preferably, the second magnetic material pattern may include a random pattern.

Preferably, the magnetic recording medium may be a magnetic disk and the second magnetic material pattern may include a plurality of line elements each of which extends in a direction that corresponds to a circumferential direction of the magnetic disk. The plurality of line elements are disposed side by side in a direction that corresponds to a radial direction of the magnetic disk.

Preferably, the magnetic recording medium may be a magnetic disk and the second magnetic material pattern may include a plurality of line elements each of which extends in a direction that corresponds to a radial direction of the magnetic disk. The plurality of line elements are disposed side by side a direction that corresponds to a circumferential direction of the magnetic disk.

According to a second aspect of the present invention, there is provided a method for formatting a magnetic recording medium including a magnetic recording layer that possesses vertical magnetic anisotropy. The method comprises: an initial magnetization step for initially magnetizing the magnetic recording layer in a first direction by applying a magnetic field to the magnetic recording medium in the first direction; an overlapping step for overlapping a master with the magnetic recording medium, the master comprising a servo zone corresponding part and a user data zone corresponding part, the servo zone corresponding part being formed with a first magnetic material pattern for recording servo information in the magnetic recording layer, the user data zone corresponding part being formed with a second magnetic material pattern for providing the magnetic recording layer with a dummy signal, the overlapping being performed so that the first magnetic material pattern and the second magnetic material pattern come into facing relation to a first region and a second region of the magnetic recording layer, respectively; and a magnetic transfer step for recording servo information in the first region of the magnetic recording layer and providing the second region of the magnetic recording layer with a dummy signal by applying a transfer magnetic field to the master and the magnetic recording medium in a second direction opposite to the first direction.

According to a third aspect of the present invention, there is provided a method for formatting a magnetic recording medium having a magnetic recording layer that possesses vertical magnetic anisotropy. The method comprises: an initial magnetization step for initially magnetizing the magnetic recording layer in a first direction by applying a magnetic field to the magnetic recording layer in the first direction; an overlapping step for overlapping a master with the magnetic recording medium, the master comprising a transparent vase and a magnetic material layer, the transparent base having a first surface upon which the magnetic material layer is formed and a second surface opposite to the first surface, the transparent base including a servo zone corresponding part and a user data zone corresponding part, the magnetic material layer including, in the servo zone corresponding part, a raised pattern for recoding servo information, the overlapping being performed so that the magnetic material layer comes into facing relation to the magnetic recording layer; a magnetic transfer step for recording the servo information to a region of the magnetic recording layer that faces the raised pattern by applying a transfer magnetic field to the master and the magnetic recoding medium in a second direction opposite to the first direction; and a light irradiation step for irradiating light toward the magnetic material layer via the transparent base so that a first region of the magnetic recording layer that faces the user data zone corresponding part is heated to a higher temperature than a second region of the magnetic recording layer that faces the servo zone corresponding part.

Preferably, in the magnetic transfer step, a magnetization direction of the first region of the magnetic recording layer may be reversed to the second direction. Further, in the light irradiation step, the irradiation of the light may be performed while a magnetic field of a lower intensity than the transfer magnetic field is applied in the first direction.

Preferably, the first surface of the transparent base may be formed, in the servo zone corresponding part, with a raised pattern corresponding to the servo information.

Preferably, an inequality $\lambda$ P×n may be satisfied, where $\lambda$ represents a wavelength of the light in the light irradiation step, P represents a minimum pitch of the raised pattern, and n represents a refractive index of the transparent base.

Preferably, the master of the third aspect may further comprise a light-shielding layer patterned correspondingly to the servo information. The light-shielding layer may be disposed between the transparent base and the magnetic recording layer of the servo zone corresponding part.

Preferably, the master may further comprise a thermal barrier layer disposed between the light-shielding layer and the magnetic material layer.

Preferably, the master may further comprise a low reflection layer disposed between the transparent base and the magnetic material layer of the user data zone corresponding part.

According to a fourth aspect of the present invention, there is provided a master for writing servo information to a magnetic recording medium by a magnetic transfer method, the magnetic recording medium including a magnetic recording layer that possesses vertical magnetic anisotropy. The master comprises: a servo zone corresponding part and a user data zone corresponding part; a transparent base including a first surface and a second surface opposite to the first surface, the first surface extending over the servo zone corresponding part and the user data zone corresponding part, the first surface being provided, in the servo zone corresponding part, with a raised pattern corresponding to the servo information; and a magnetic material layer provided on the first surface of the transparent base to extend over the servo zone corresponding part and the user data zone corresponding part, the magnetic material layer being provided, in the servo zone corresponding part, with a raised pattern corresponding to the servo information.

Preferably, the first surface may be provided, in the user data zone corresponding part, with a thermal-buffer raised pattern adjacent to the servo zone corresponding part.

Preferably, the master of the fourth aspect may further comprise a low reflection layer disposed between the transparent base and the magnetic material layer in the user data zone corresponding part.

According to a fifth aspect of the present invention, there is provided a master for writing servo information to a magnetic recording medium by a magnetic transfer method, the magnetic recording medium including a magnetic recording layer that possesses vertical magnetic anisotropy. The master comprises: a servo zone corresponding part and a user data zone corresponding part; a transparent base including a first surface and a second surface opposite to the first surface, the first surface extending over the servo zone corresponding part and the user data zone corresponding part; a magnetic material layer provided on the first surface of the transparent base and extending over the servo zone corresponding part and the user data zone corresponding part, the magnetic material layer being provided, in the servo zone corresponding part, with a raised pattern corresponding to the servo information; and a low reflection layer disposed between the transparent base and the magnetic material layer in the user data zone corresponding part.

According to a sixth aspect of the present invention, there is provided a master for writing servo information to a magnetic recording medium by a magnetic transfer method, the magnetic recording medium including a magnetic recording layer possessing vertical magnetic anisotropy. The master comprises: a servo zone corresponding part and a user data zone corresponding part; a transparent base including a first surface and a second surface opposite to the first surface, the first surface extending over the servo zone corresponding part and the user data zone corresponding part; a magnetic material layer provided on the first surface of the transparent base and extending over the servo zone corresponding part and the user data zone corresponding part, the magnetic material layer being provided, in the servo zone corresponding part, with a raised pattern corresponding to the servo information; and a light-shielding layer patterned correspondingly to the servo information, the light-shielding layer being disposed between the transparent base and the magnetic material layer in the servo zone corresponding part.

Preferably, the master of the sixth aspect may further comprise a thermal barrier layer provided between the light-shielding layer and the magnetic material layer.

Other features and advantages of the present invention will become apparent from the detailed description given below with reference to the accompanying drawings.

BRIEF DESCRIPTION OF THE DRAWINGS

FIGS. 4A and 4B are both partial enlarged views that extend in the circumferential direction of the magnetic transfer master;

DESCRIPTION OF THE PREFERRED EMBODIMENTS

Figure 1:
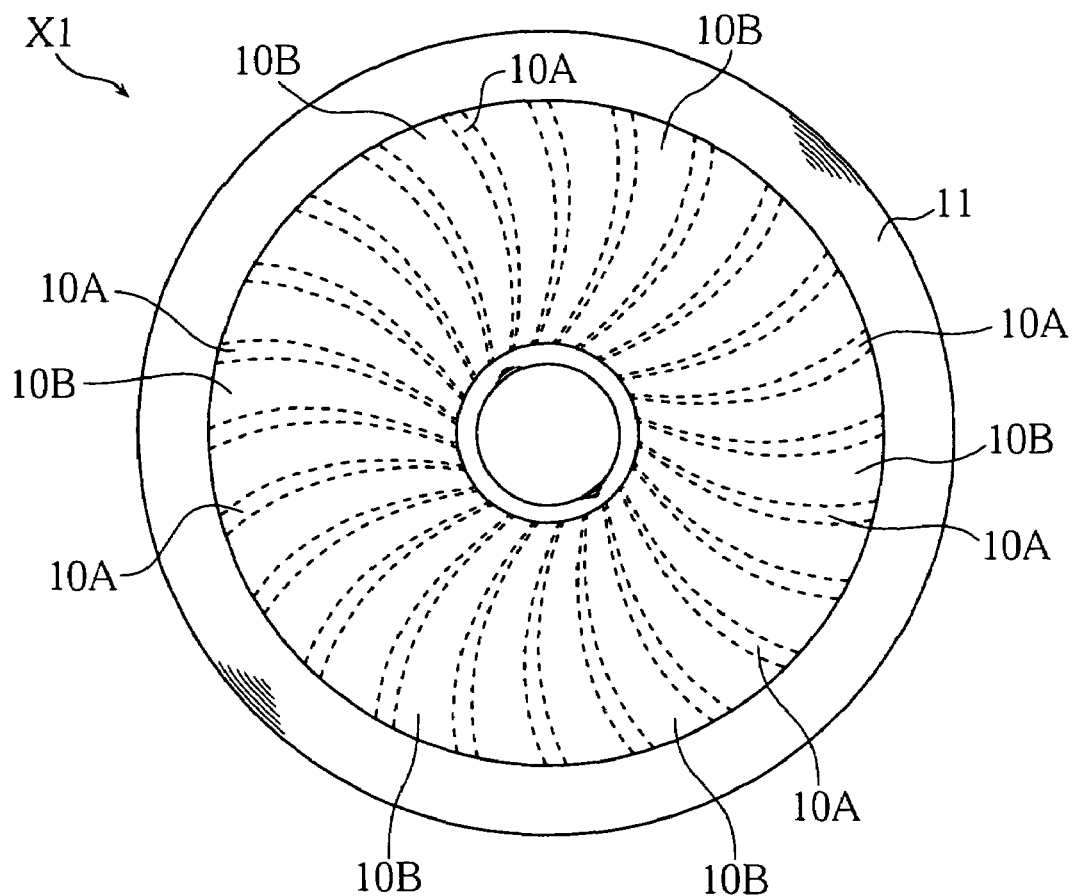
FIG. 1 is a plan view of a magnetic transfer master according to a first embodiment of the present invention.
Figure 2:
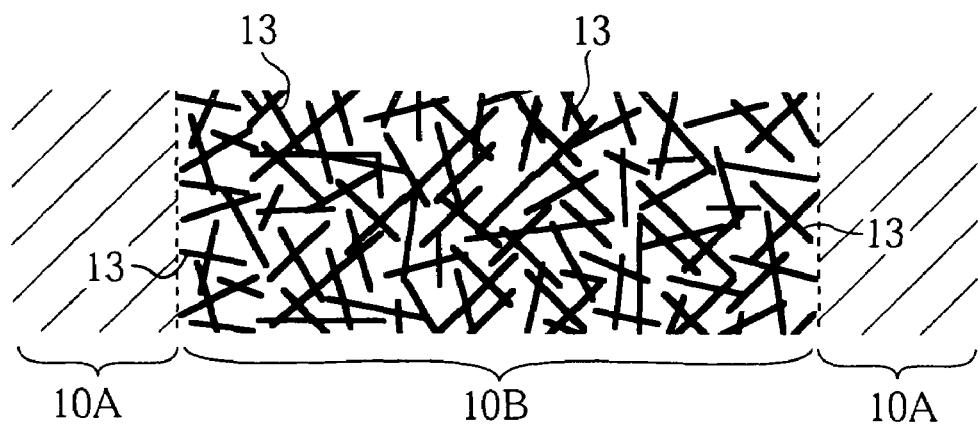
FIG. 2 is a partial enlarged view of FIG. 1 that extends in the circumferential direction of the magnetic transfer master.
Figure 3:
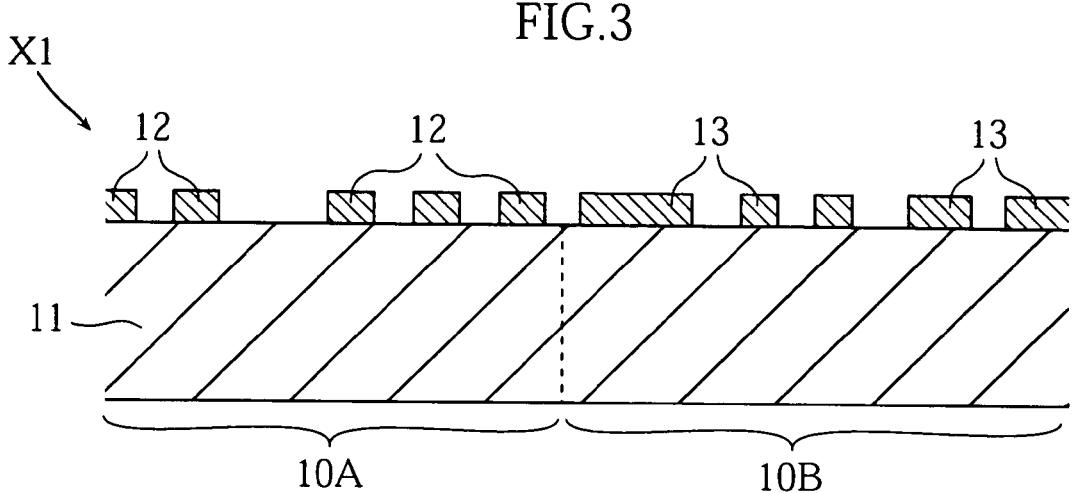
FIG. 3 is a partial cross-sectional view of the magnetic transfer master according to the first embodiment.

FIGS. 1 to 3 show a magnetic transfer master X1 according to a first embodiment of the present invention. FIG. 1 is a plan view of the master X1. FIG. 2 is another plan view showing an enlarged part of the master X1. FIG. 3 is a partial cross-sectional view of the master X1.

The master X1 comprises a base 11, a magnetic material pattern 12 (omitted from FIGS. 1 and 2), and a magnetic material pattern 13 (omitted from FIG. 1). As shown in FIG. 1, the master X1 is divided into a plurality of servo zone corresponding parts 10A and a plurality of user data zone corresponding parts 10B.

The base 11 serves to secure the rigidity required for the master X1 and has a disk shape that is larger than that of the magnetic disk that is to be fabricated. Such base 11 is made of Si or Ni, for example.

Each of the servo zone corresponding parts 10A is a part for forming a servo zone of the magnetic disk to be fabricated. In the servo zone corresponding part 10A, a magnetic material pattern 12 is provided on the base 11, as shown in FIG. 3. The magnetic material pattern 12 has a pattern shape that corresponds with predetermined servo information that is to be written on the magnetic disk, and is made of a soft magnetic material or a ferromagnetic material. When made of a ferromagnetic material, the magnetic material pattern 12 possesses vertical magnetic anisotropy, being magnetized in the thickness direction of the master X1. As a soft magnetic material, Permalloy, Ni, and FeCoNi, for example, can be adopted. As a ferromagnetic material, FeCo and CoCr, for example, can be adopted. Servo information includes servo-clocks, address marks, and position detection marks, for example. In the present invention, the pattern shape that corresponds with the servo information signifies the shape of a positive pattern for forming servo information or the shape of a negative pattern for forming servo information. The thickness of the magnetic material pattern 12 is 50 to 200 nm, for example.

Each of the user data zone corresponding parts 10B is a part that corresponds with the user data zone formed between the servo zones of the magnetic disk to be fabricated. In the user data zone corresponding part 10B, the magnetic material pattern 13 is provided on the base 11, as shown in FIG. 3. The magnetic material pattern 13 has a pattern shape that corresponds with a predetermined dummy signal that is to be written on the magnetic disk and is made of a soft magnetic material or a ferromagnetic material. When made of a ferromagnetic material, the magnetic material pattern 13 possesses vertical magnetic anisotropy and is magnetized in the thickness direction of the master X1. As a soft magnetic material, Permalloy, Ni, and FeCoNi, for example, can be adopted. As a ferromagnetic material, FeCo and CoCr, for example, can be adopted. In this embodiment, the magnetic material pattern 13 is a random pattern, as seen from FIG. 2. A dummy signal is a magnetization pattern that is formed in a user data zone in order to render the magnetization direction of the user data zone of the magnetic disk to be nonuniform. According to the present invention, the pattern shape that corresponds with the dummy signal signifies the shape of a positive pattern for forming the dummy signal or the shape of a negative pattern for forming the dummy signal. The fine density of the dummy signal formed on the magnetic disk can be adjusted by regulating the fine density of the magnetic material pattern 13. The thickness of the magnetic material pattern 13 is 50 to 200 nm, for example.

Figure 4A:
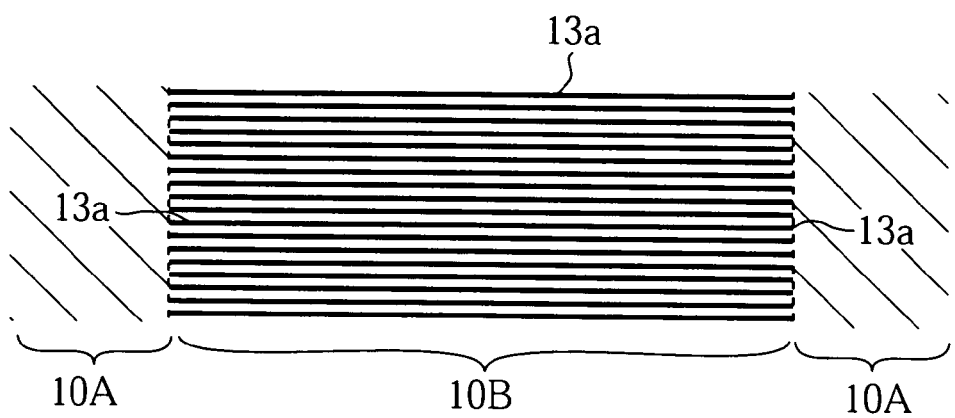
FIGS. 4A-4B show two modified examples of the second magnetic material pattern of the magnetic transfer master according to the first embodiment, where
Figure 4B:
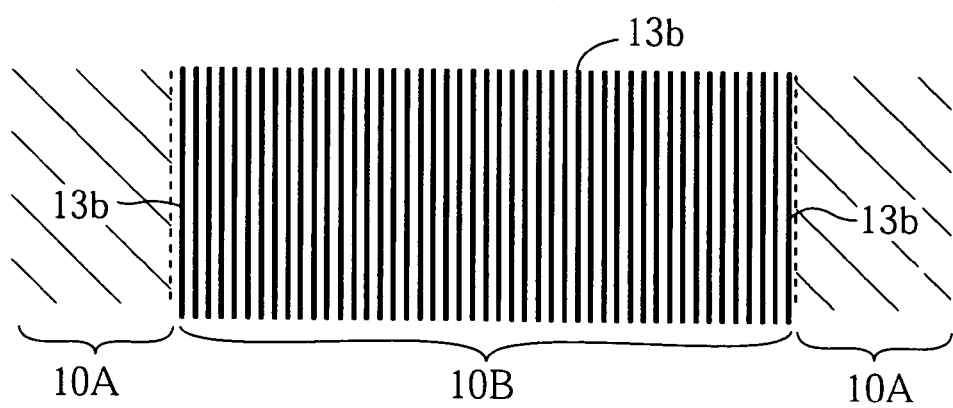

FIG. 4 shows the magnetic material patterns 13a and 13b, which are modified examples of the magnetic material pattern 13. The magnetic material pattern 13a shown in FIG. 4A consists of a plurality of line elements each of which extends in a direction corresponding to the circumferential direction of the magnetic disk. The plurality of line elements are disposed side by side in a direction corresponding to the radial direction of the magnetic disk. The magnetic material pattern 13b shown in FIG. 4B consists of a plurality of line elements each of which extends in a direction corresponding to the radial direction of the magnetic disk. The plurality of line elements are disposed side by side in a direction corresponding to the circumferential direction of the magnetic disk. A constitution of this kind is suitable in forming a cyclic dummy signal. By adjusting the parallel pitch of the plurality of line elements of the magnetic material pattern 13a and the parallel pitch of the plurality of line elements of the magnetic material pattern 13b, the fine density of the dummy signal formed on the magnetic disk can be adjusted.

Figure 5A:
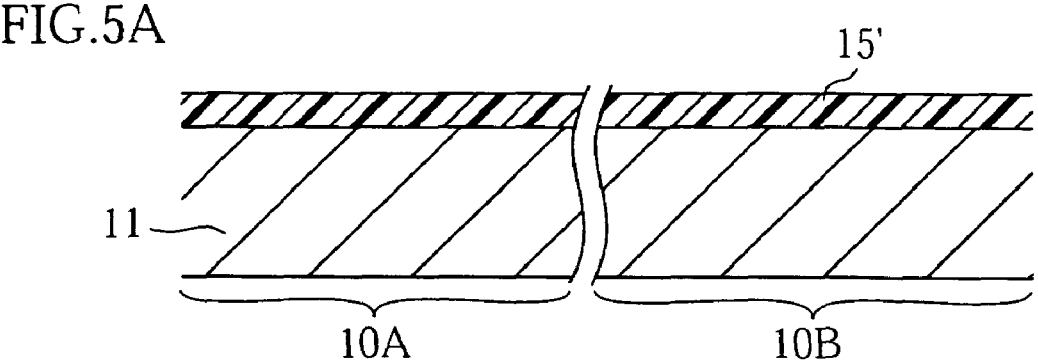
FIGS. 5A-5D show a method for fabricating the magnetic transfer master according to the first embodiment.
Figure 5B:
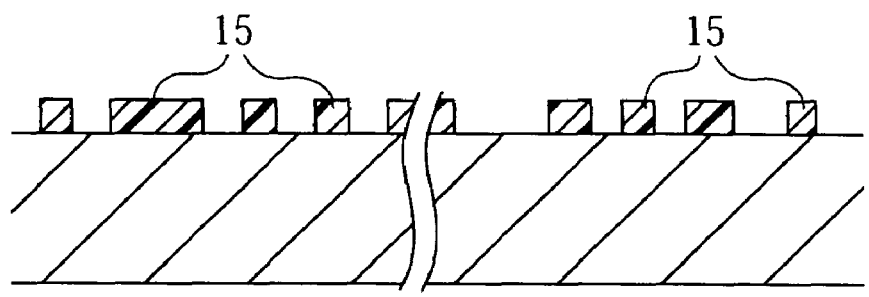
Figure 5C:
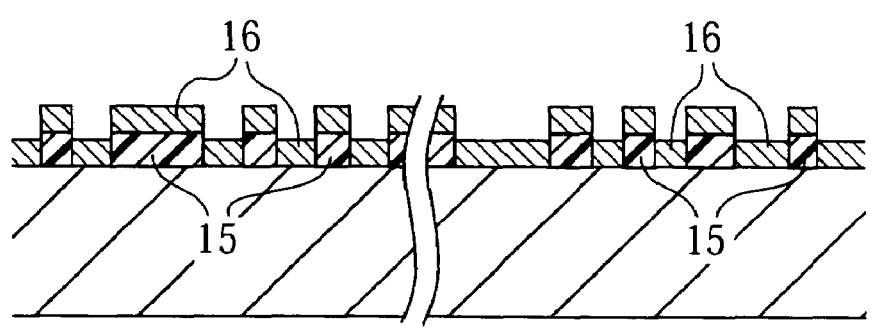
Figure 5D:
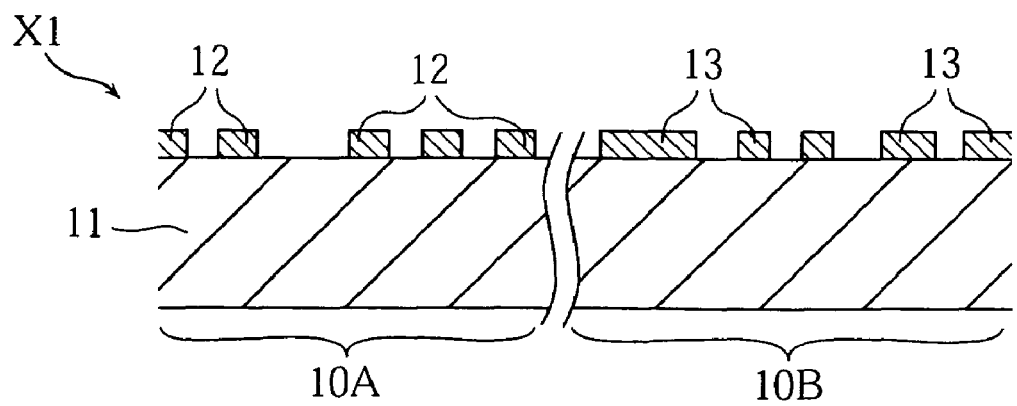

FIGS. 5A-5D show an example of the method for fabricating the master X1. In this method, a resist film 15' is first formed on the base 11 by spin coating as shown in FIG. 5A. The resist film 15' is an electron beam resist film or a photo-resist film. Next, as shown in FIG. 5B, a resist pattern 15 is formed by subjecting the resist film 15, to photographic exposure processing and development processing. Thereafter, a magnetic material film 16 is formed across the base 11 and the resist pattern 15 as shown in FIG. 5C by depositing a predetermined magnetic material by sputtering, for example. Next, by dissolving the resist pattern 15 by allowing a predetermined solvent to act thereon, for example, the resist pattern 15 and the magnetic material film 16 that exists thereon are removed as shown in FIG. 5D.

As described above, the master X1 can be fabricated by forming the magnetic material patterns 12 and 13 on the base 11.

Figure 6A:
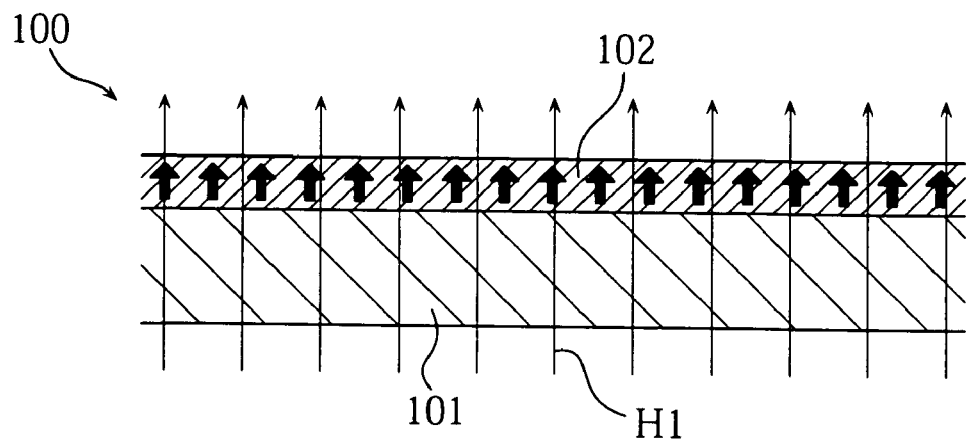
FIGS. 6A-6C show a method for formatting the vertical magnetic recording medium that is performed by using the magnetic transfer master according to the first embodiment.
Figure 6B:
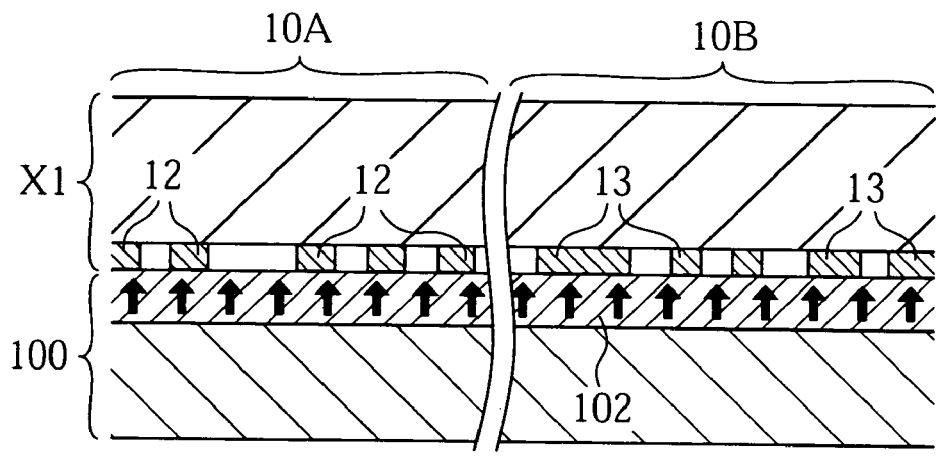
Figure 6C:
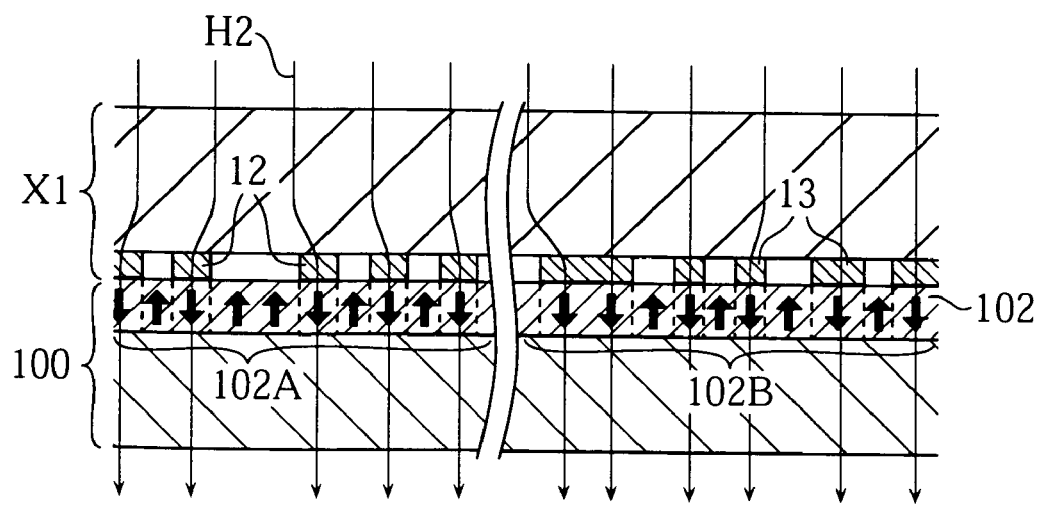
Figure 7:
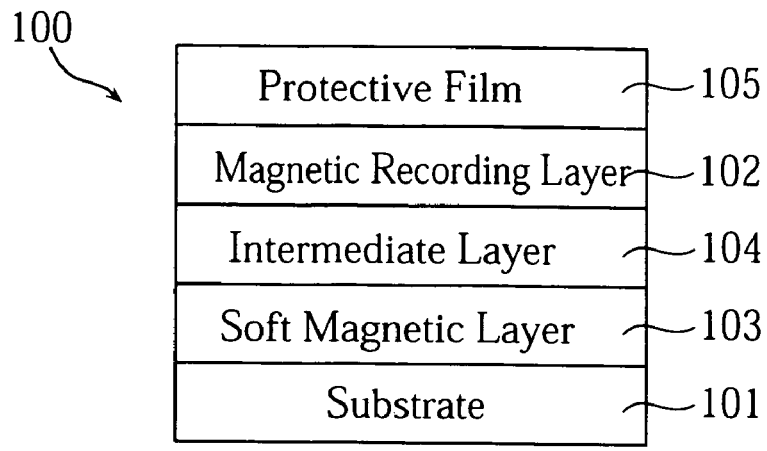
FIG. 7 shows the laminated structure of a magnetic disk that is one example of a vertical magnetic recording medium.

FIGS. 6A-6C show a method for formatting a magnetic recording medium 100 that is performed by using the master X1. The magnetic recording medium 100 has a laminated structure that consists of a substrate 101, magnetic recording layer 102, soft magnetic layer 103, intermediate layer 104, and protective film 105, as shown in FIG. 7, and is constituted as a vertical magnetic recording-type magnetic disk. With a view to simplifying the illustration, layers and films of the magnetic recording medium 100 other than the substrate 101 and the magnetic recording layer 102 have been omitted from FIG. 6. The magnetic recording layer 102 is a magnetized vertical magnetization film with an axis of easy magnetization in a direction that is perpendicular to the film surface of the magnetic film constituting this layer, and is a part that allows a predetermined signal to be recorded by changing the magnetization direction. A magnetic recording layer 102 of this kind constitutes the recording face of the magnetic recording medium 100. The soft magnetic layer 103 is made of a soft magnetic material of high magnetic permeability. The intermediate layer 104 is made of a nonmagnetic material and serves to separate the magnetic recording layer 102 and soft magnetic layer 103 magnetically. The protective film 105 physically and chemically protects the magnetic recording layer 102 from the external environment while serving to secure the lubricating ability of the medium surface with respect to the magnetic head. A magnetic recording medium 100 of this kind is used as a medium that is mounted within the hard disk device, for example.

In this method, first, in the initial magnetization step, the magnetic recording layer 102 is initially magnetized in a first direction by applying the initial magnetization magnetic field H1 to the magnetic recording medium 10 in the first direction as shown in FIG. 6A. The initial magnetization magnetic field H1 is 3000 to 7000Oe, for example. Thereafter, in the overlapping step, the master X1 and magnetic recording medium 100 are overlapped so that the magnetic material patterns 12 and 13 and the magnetic recording layer 102 face each other as shown in FIG. 6B. Next, in the transfer step, by applying the transfer magnetic field H2 to the master X1 and magnetic recording medium 100 in a second direction that is the reverse of the first direction, servo information is recorded on the magnetic recording layer 102 by magnetizing the points in magnetic recording layer 102 that face the magnetic material pattern 12 in the second direction, and a dummy signal is formed in the magnetic recording layer 102 by magnetizing points in the magnetic recording layer 102 that face the magnetic material pattern 13 in the second direction, as shown in FIG. 6C. The transfer magnetic field H2 is 3000 to 7000Oe, for example.

Figure 8:
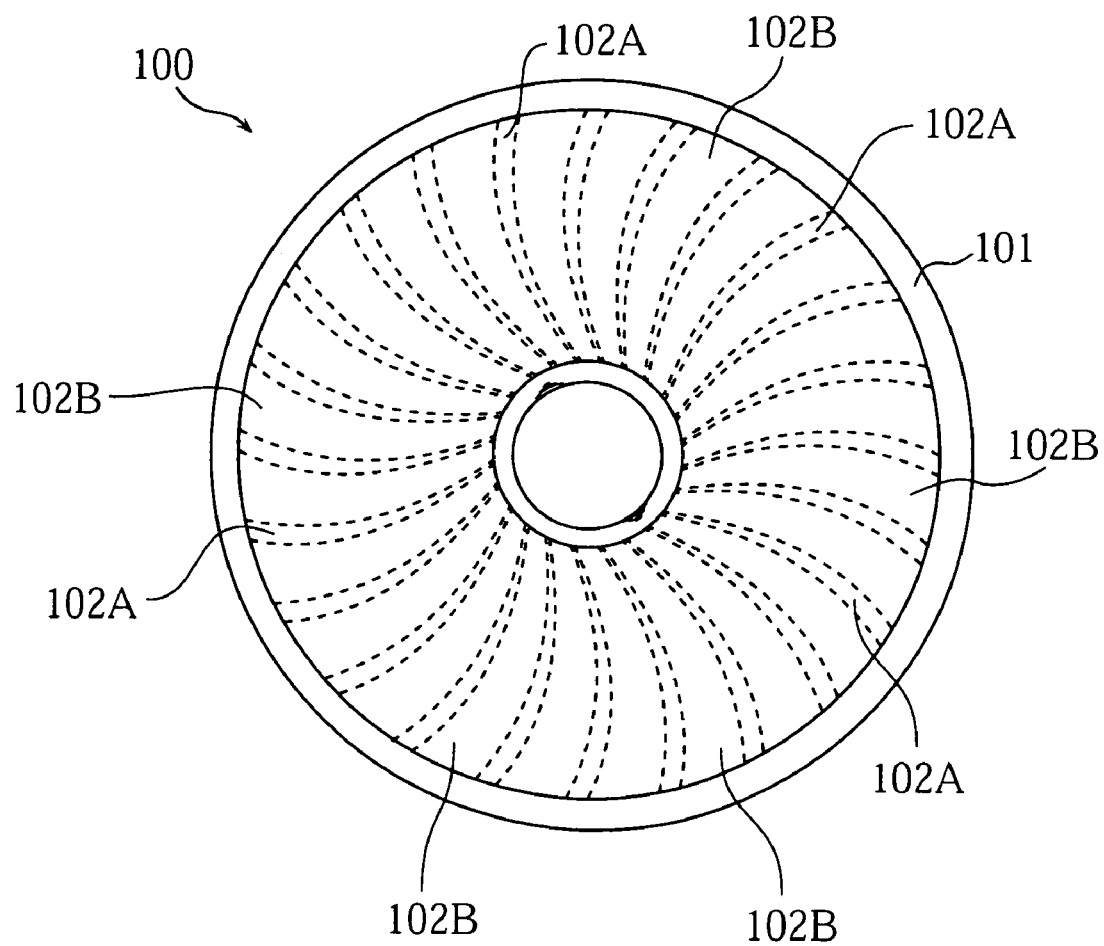
FIG. 8 shows the constitution of the recording face of the vertical magnetic recording medium in FIG. 7 that has undergone the formatting process of the present invention.
Figure 9:
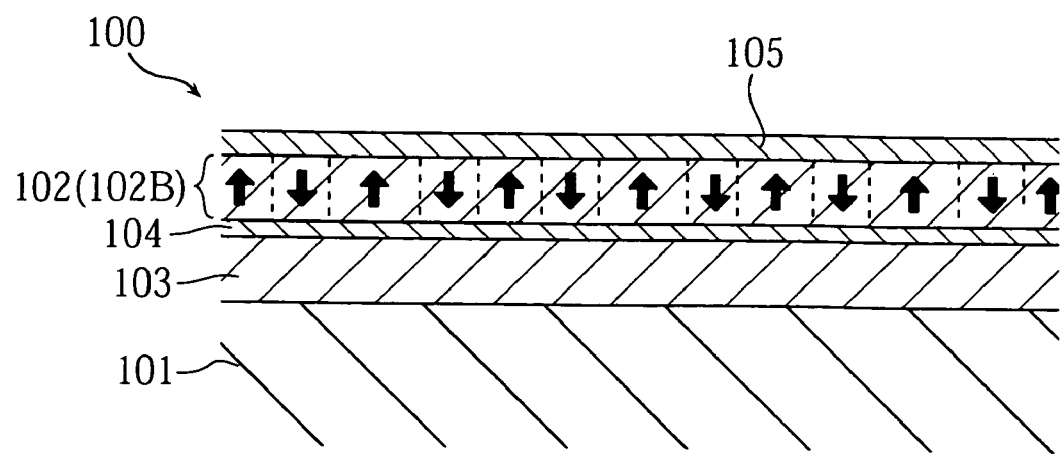
FIG. 9 is a partial cross-sectional view of the vertical magnetic recording medium in FIG. 7 that has undergone the formatting process of the present invention.

FIGS. 8 and 9 show a magnetic recording medium 100 that has undergone such a formatting process. FIG. 8 is a plan view of the magnetic recording medium 100 and FIG. 9 is a partial cross-sectional view of the magnetic recording medium 100 that shows the magnetization state of the user data zone 102B of the magnetic recording layer 102. As shown in FIG. 8, servo zones 102A where servo information (not illustrated) is recorded and user data zones 102B, in which a dummy signal (not shown) is formed, are formed from the magnetic recording layer 102 through to the recording face of the magnetic recording medium 100. In the magnetic recording medium 100, the magnetization direction of the user data zones 102B is nonuniform as shown in FIG. 9.

Figure 10:
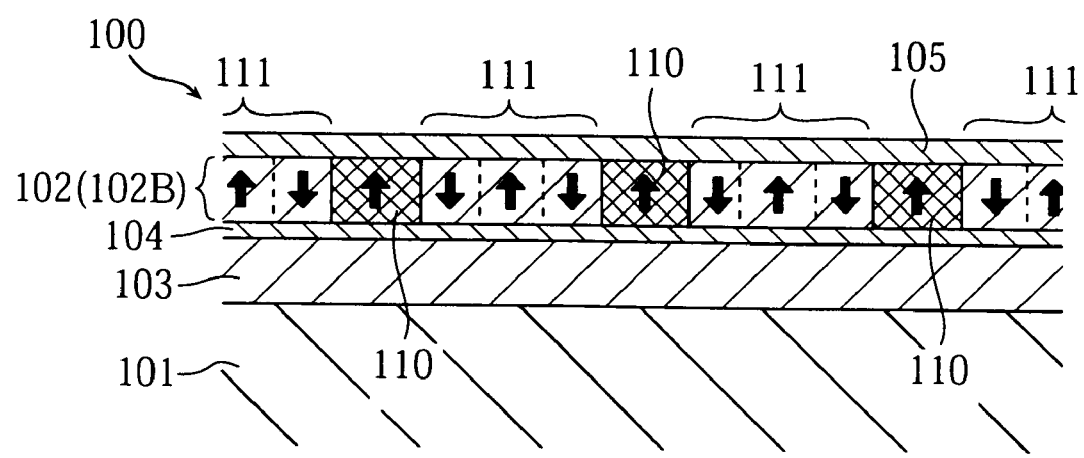
FIG. 10 shows a state after user data has been recorded on the vertical magnetic recording medium in FIG. 9.

FIG. 10 shows a state after user data has been recorded on the magnetic recording medium 100. When information tracks 110 are formed by recording predetermined data in the user data zones 102B of the magnetic recording layer 102 by a magnetic head (not shown) comprising a predetermined write head element, intertrack portions 111 with a nonuniform magnetization direction are produced between the information tracks 110 of the user data zone 102B. Because the magnetization states of the intertrack portions 111 are nonuniform, the non-signal magnetic field that is formed close to the medium surface originating in the intertrack portions 111 is weaker than the non-signal magnetic field that is formed close to the surface of the magnetic disk 200 above, for example, the magnetization direction of the intertrack portions of which is uniform. Therefore, when the formatting method as mentioned above is adopted, same being performed by employing the master X1, a vertical magnetic recording medium that has a weak non-signal magnetic field acting on the read head element during playback can be obtained. A vertical magnetic recording medium of this kind is suitable in obtaining a favorable playback characteristic.

Figure 11:
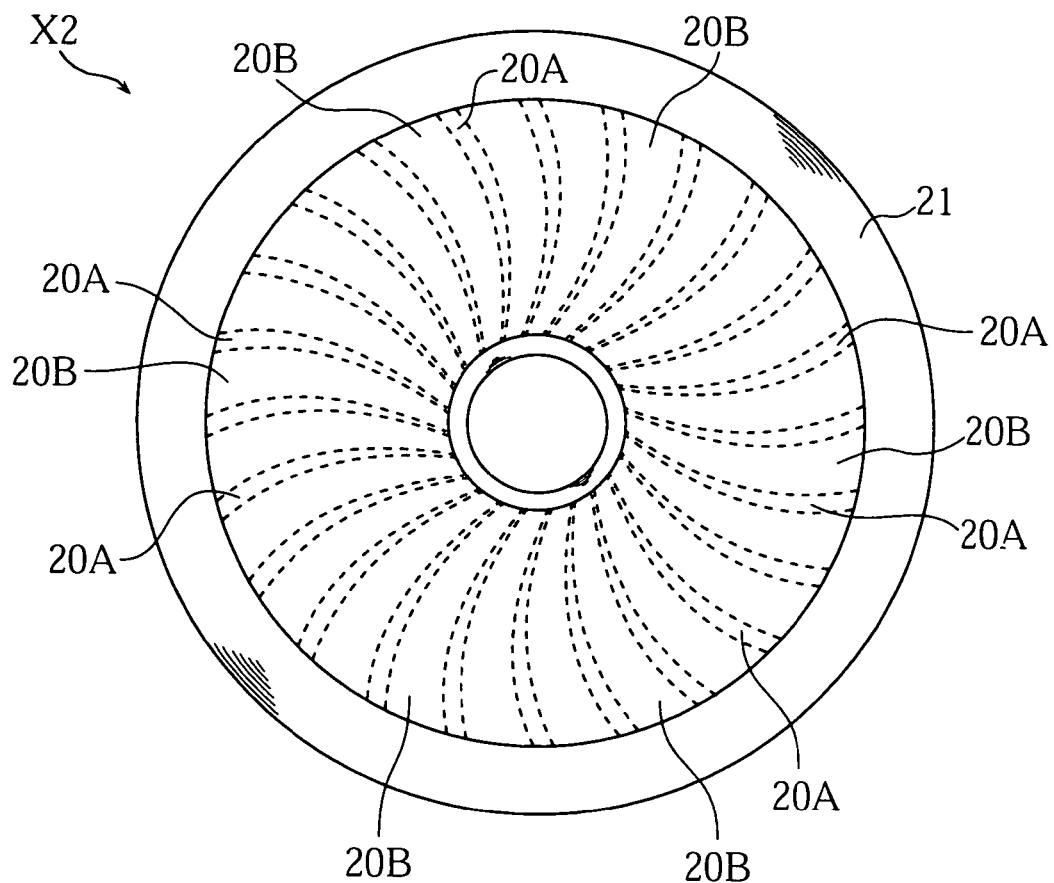
FIG. 11 is a plan view of the magnetic transfer master according to a second embodiment of the present invention.
Figure 12:
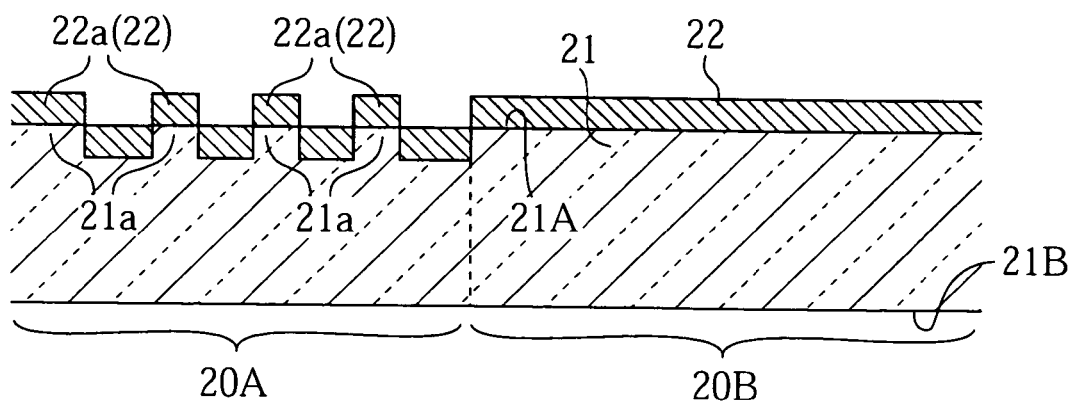
FIG. 12 is a partial cross-sectional view of the magnetic transfer master according to the second embodiment.

FIGS. 11 and 12 show a magnetic transfer master X2 according to a second embodiment of the present invention. FIG. 11 is a plan view of the master X2, and FIG. 12 is a partial cross-sectional view of the master X2.

The master X2 is divided into a plurality of servo zone corresponding parts 20A and a plurality of user data zone corresponding parts 20B, as shown in FIG. 11, and has a laminated structure made of a base 21 and a magnetic material layer 22, as shown in FIG. 12. Each of the servo zone corresponding parts 20A is a part for forming a servo zone of the magnetic disk to be fabricated. Each of the user data zone corresponding parts 20B is a part that corresponds with user data zones that are formed between the servo zones of the magnetic disk to be fabricated.

The base 21 is a transparent substrate with a disk shape that is larger than the magnetic disk to be fabricated, having a first surface 21A and a second surface 21B. The first and second surfaces 21A and 21B extend across the servo zone corresponding part 20A and user data zone corresponding part 20B. The first surface 21A has a raised pattern 21a in the servo zone corresponding part 20A. The raised pattern 21a has a pattern shape that corresponds to predetermined servo information that is to be written to the magnetic disk. The height of the raised pattern 21a is 10 to 110 nm, for example. Further, the base 21 is made of $SiO_2$, for example (refractive index: approximately 1.5). Supposing that the wavelength of the irradiated light of the light irradiation step of the following formatting method that is performed by using the master X2 is $\lambda$ and that the refractive index of the base 21 is n, the height of the raised pattern 21a is preferably $\lambda(2k-1)/(8n)$ [k: positive integer] from the perspective of increasing the intensity of the reflected light in the light irradiation step. Therefore, in a case where $\lambda=266$ [nm] (a laser wavelength that is four times a YAG wavelength) and n=1.5, the height of the raised pattern 21a is preferably 66.5 nm (k=2), for example.

The magnetic material layer 22 is made of a soft magnetic material or a ferromagnetic material. When made of a ferromagnetic material, the magnetic material layer 22 is a magnetized vertical magnetization film with an axis of easy magnetization in a direction that is perpendicular to the film surface of the magnetic film constituting this layer. Permalloy, Ni, and FeCoNi, for example, can be adopted as a soft magnetic material. As a ferromagnetic material, FeCo and CoCr, for example, can be adopted. Further, the magnetic material layer 22 has a raised pattern 22a in the servo zone corresponding part 20A and is level in the user data zone corresponding part 20B. The raised pattern 22a has a pattern shape that corresponds to predetermined servo information that is to be written to the magnetic disk. The thickness of the magnetic material layer 22 and the height of the raised pattern 22a are each 50 to 200 nm, for example.

Figure 13A:
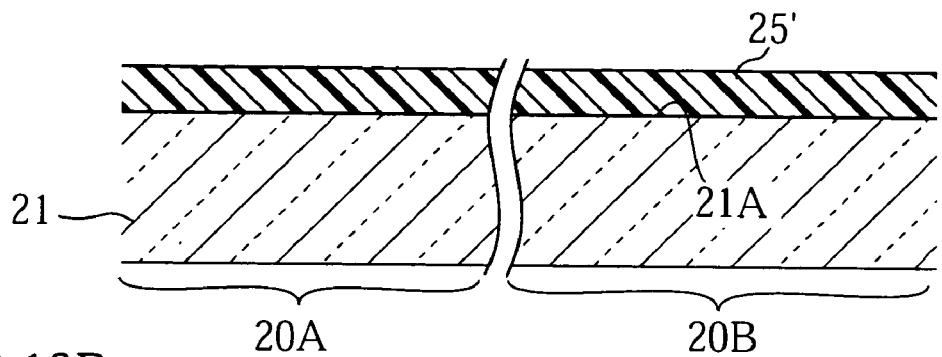
FIGS. 13A-13D show a method for fabricating the magnetic transfer master of the second embodiment.
Figure 13B:
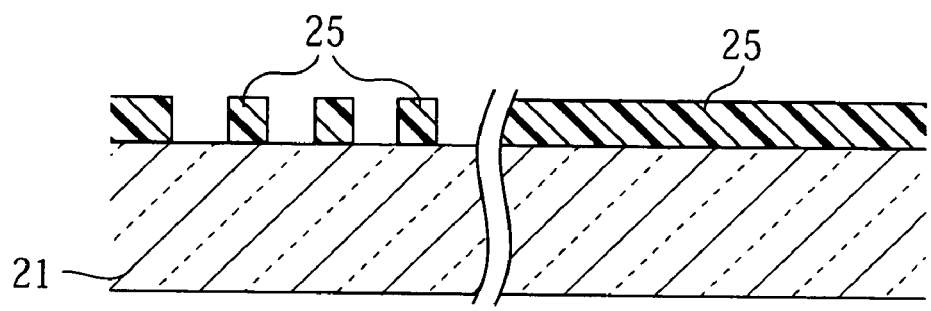
Figure 13C:
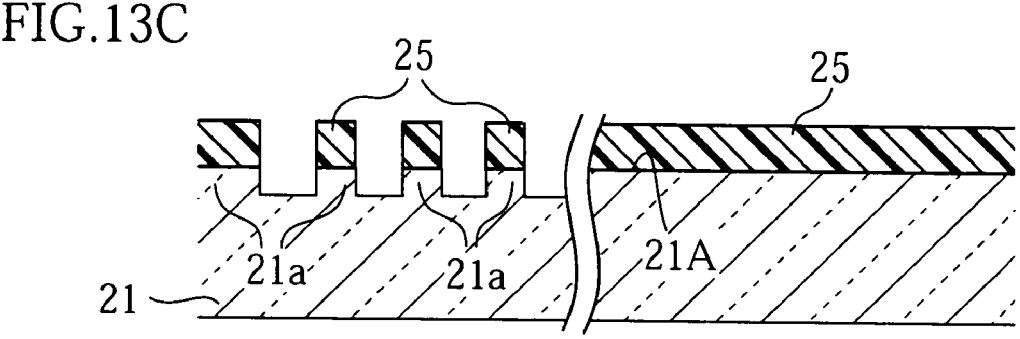
Figure 13D:
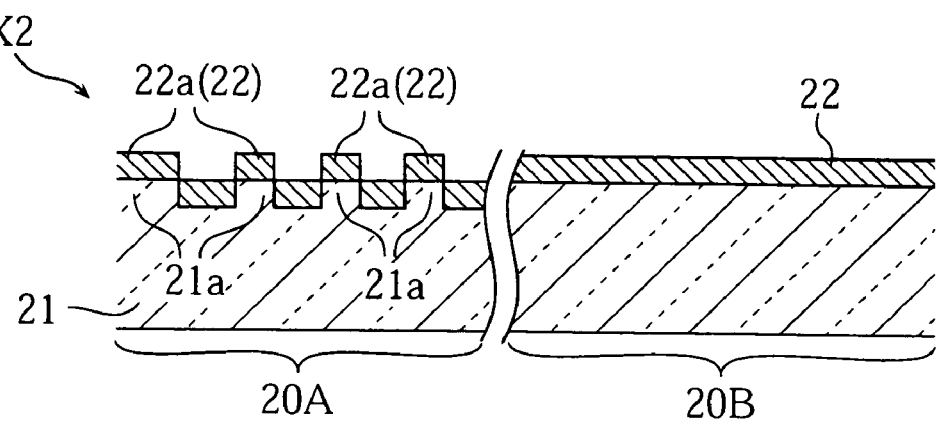

FIGS. 13A-13D show an example of a method for fabricating the master X2. In this method, as shown in FIG. 13A, a resist film 25' is first formed on the first surface 21A of the base 21 by spin coating. The resist film 25' is an electron beam resist film or a photoresist film. Thereafter, as shown in FIG. 13B, a resist pattern 25 is formed by subjecting the resist film 25' to photographic exposure processing and development processing. Next, as shown in FIG. 13C, a raised pattern 21a is formed on the first surface 21A of the base 21 by etching the base 21 with the resist pattern 25 serving as a mask. Reactive Ion Etching (RIE), for example, can be adopted as the etching method. Thereafter, the magnetic material layer 22 is formed as shown in FIG. 13D following removal of the resist pattern 25. More specifically, the magnetic material layer 22 is formed by depositing a predetermined magnetic material on the base 21 by sputtering, for example, following removal of the resist pattern 25 by allowing a predetermined solvent to act thereon, for example. The raised pattern 22a is formed on the magnetic material layer 22 in correspondence with the uneven shape of the raised pattern 21a of the base 21. In this manner, the master X2 can be fabricated.

Figure 14A:
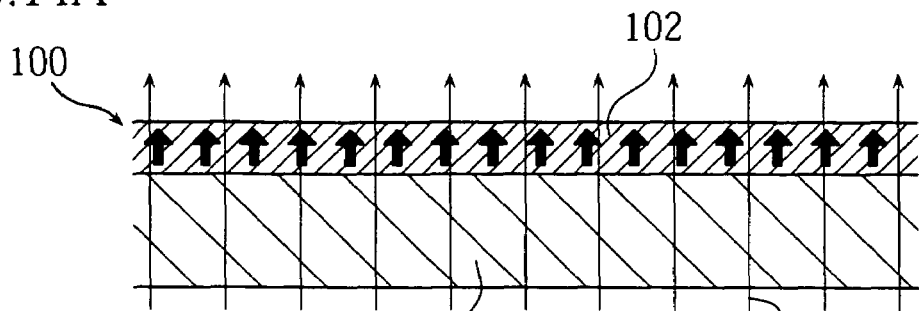
FIGS. 14A-14D show a method for formatting the vertical magnetic recording medium that is performed by using the magnetic transfer master of the second embodiment.
Figure 14B:
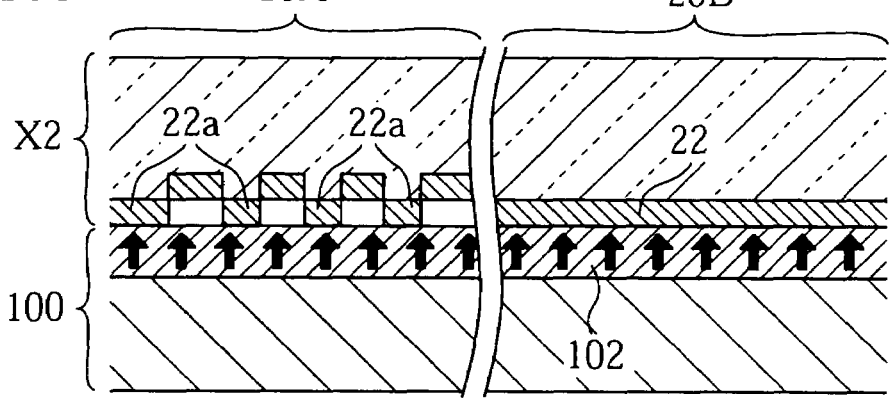
Figure 14C:
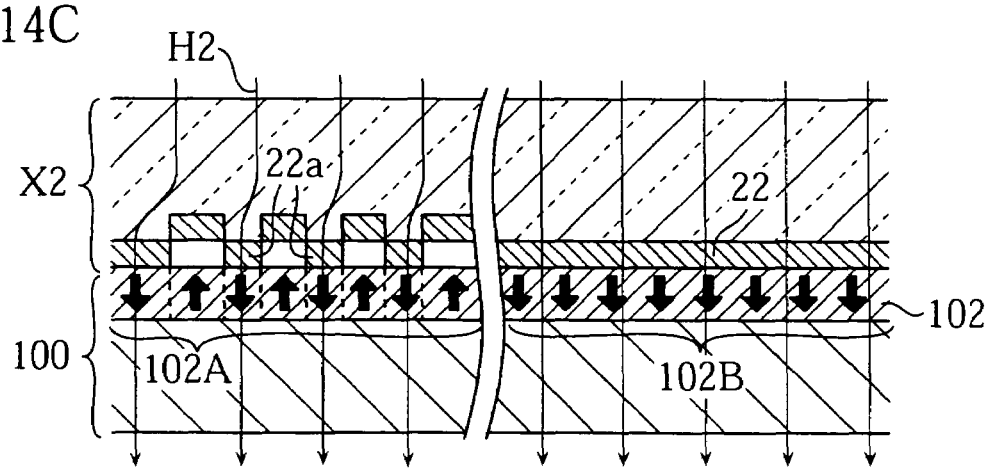
Figure 14D:
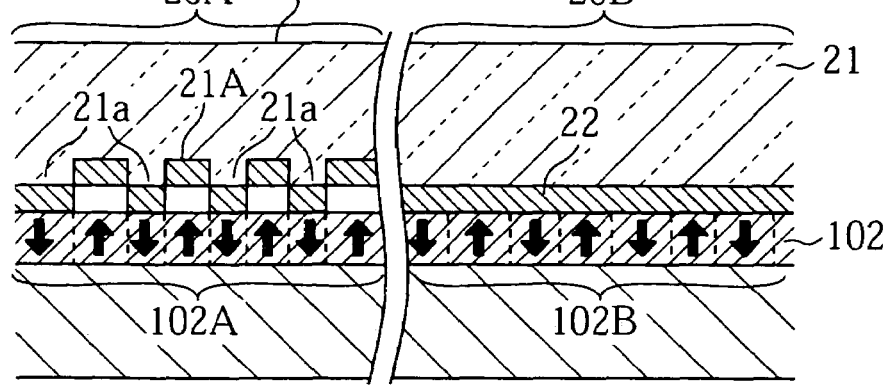

FIGS. 14A-14D show a method for formatting the magnetic recording medium 100 (shown in FIG. 7) that is performed by using the master X2. In this formatting method, first, in the initial magnetization step, the magnetic recording layer 102 is initially magnetized in a first direction by applying the initial magnetization magnetic field H1 to the magnetic recording medium 100 in the first direction as shown in FIG. 14A. With a view to simplifying the illustration, layers and films in the magnetic recording medium 100 other than the substrate 101 and magnetic recording layer 102 have been omitted from FIG. 14. Thereafter, in the overlapping step, the master X2 and the magnetic recording medium 100 are overlapped so that the raised pattern 22a of the magnetic material layer 22 and the magnetic recording layer 102 face each other, as shown in FIG. 14B. Next, in the transfer step, as shown in FIG. 14C, servo information is recorded in the magnetic recording layer 102 by magnetizing points in the magnetic recording layer 102 that face the raised pattern 22a in a second direction, which is the reverse of the first direction, by applying the transfer magnetic field H2 to the master X2 and magnetic recording medium 100 in the second direction, and points in the magnetic recording layer 102 that face the user data zone corresponding parts 20B are magnetized in the second direction. As a result of undergoing this process, the servo zones 102A and user data zones 102B are generated in the magnetic recording medium 100. Thereafter, the magnetization direction of the user data zone 102B of the magnetic recording medium 100 is rendered nonuniform as shown in FIG. 14D by irradiating light (a laser) from the side of the transparent base 21 of the master X2 toward the magnetic material layer 22 thereof.

When light irradiation is performed from the side of the base 21 of the master X2 toward the magnetic material layer 22 thereof, in the servo zone corresponding part 20A, the diffraction of the irradiated light occurs at the first surface 21A on account of the uneven shape of the raised pattern 21a. Hence, part of the irradiated light is then reflected toward the second surface 21B of the substrate 21. In the user data zone corresponding part 20B, on the other hand, such diffraction does not occur. For this reason, the magnetic material layer 22 absorbs a larger amount of light energy and reaches a higher temperature in the user data zone corresponding part 20B than in the servo zone corresponding part 20A. The heat energy accumulated in the magnetic material layer 22 is transmitted to the magnetic recording layer 102 of the magnetic recording medium 100, and the user data zone 102B of the magnetic recording layer 102 rises in temperature more than the servo zone 102A. As a result, magnetization reversal is produced at different points in the user data zone 102B, meaning that the magnetization direction of the user data zone 102B is nonuniform. In this process, a temperature rise in the servo zone 102A is suppressed so that the servo information already recorded is not destroyed, while the intensity and wavelength of the irradiated light are adjusted so that nonuniform magnetization is generated in the user data zone 102B by causing the uniform magnetization in the second direction of the user data zone 102B to be disturbed by thermal fluctuations. Furthermore, in this process, a magnetic field that is weaker than the transfer magnetic field H2 may be applied in a first direction in conjunction with light irradiation. The application of such an auxiliary external magnetic field is suitable in generating magnetization reversal in the user data zone 102B through light irradiation at a lower intensity.

Supposing that the cycle of the unevenness (the shortest pitch, for example) in the raised pattern 21a of the base 21 is P, the wavelength of the irradiated laser is $\lambda$, the refractive index of the base 21 is n, and the angle formed with the normal of the diffracted light (virtual lines running in parallel in the thickness direction of the base 21) is $\theta$, in the light irradiation step above, the diffraction phenomenon is generated in accordance with the conditional expression $(P \times n)\sin\theta = m \times \lambda$ [m: positive integer] in the servo zone corresponding part 20A. This is because $(P \times n)\sin\theta$ is equivalent to a so-called optical path variation and the diffracted light appears at points at which the m multiple of the wavelength $\lambda$ is equal to the optical path variation. Further, because $\sin\theta$ is equal to or less than 1 and m is equal to or more than 1, the possibility of the diffraction phenomenon occurring when $\lambda \cdot P \times n$ can be understood from the conditional expression above. Hence, in the above light irradiation step, light (a laser) of wavelength $\lambda$, which fulfills at least $\lambda \cdot P \times n$, must be adopted. As the irradiated laser, a laser with a wavelength that is four times that of a YAG laser (wavelength 266 nm), an Ar SHG laser (wavelength 247 nm), and an ArF laser (wavelength 193 nm), for example, can be adopted in accordance with the unevenness cycle P. In addition, due to the disparity in the height of the raised pattern 21a of the base 21, the intensity of the light reflected toward at least the second surface 21B of the diffraction phenomenon changes, and, when it is known that a higher reflected light intensity can be obtained when the height is equal to $\lambda(2k-1)/(8n)$ [k: positive integer], the height of the raised pattern 21a is preferably $\lambda(2k-1)/(8n)$ [k: positive integer] in the present embodiment.

Servo zones 102A recorded with servo information and user data zones 102B, the magnetization direction of which is nonuniform, are formed as shown in FIG. 9, for example, from the magnetic recording layer 102 through to the recording face of the magnetic recording medium 100 that has undergone such formatting. Therefore, when information tracks 110 are formed by recording predetermined data in the user data zones 102B of the magnetic recording layer 102 by a magnetic head (not illustrated) comprising a predetermined write head element, intertrack portions 111, the magnetization direction of which is nonuniform, are generated as shown in FIG. 10, for example, between the information tracks 110 of the user data zone 102B. Because the magnetization states of the intertrack portions 111 are nonuniform, the non-signal magnetic field that is formed close to the medium surface that originates in the intertrack portions 111 is weaker than the non-signal magnetic field that is formed close to the surface of the magnetic disk 200 above, for example, the magnetization direction of the intertrack portions thereof being uniform. Therefore, when the formatting method as described above that is performed by using the master X2 is adopted, it is possible to obtain a vertical magnetic recording medium that has a weak non-signal magnetic field acting on the read head element during playback. A vertical magnetic recording medium of this kind is suitable in obtaining a favorable playback characteristic.

Figure 15:
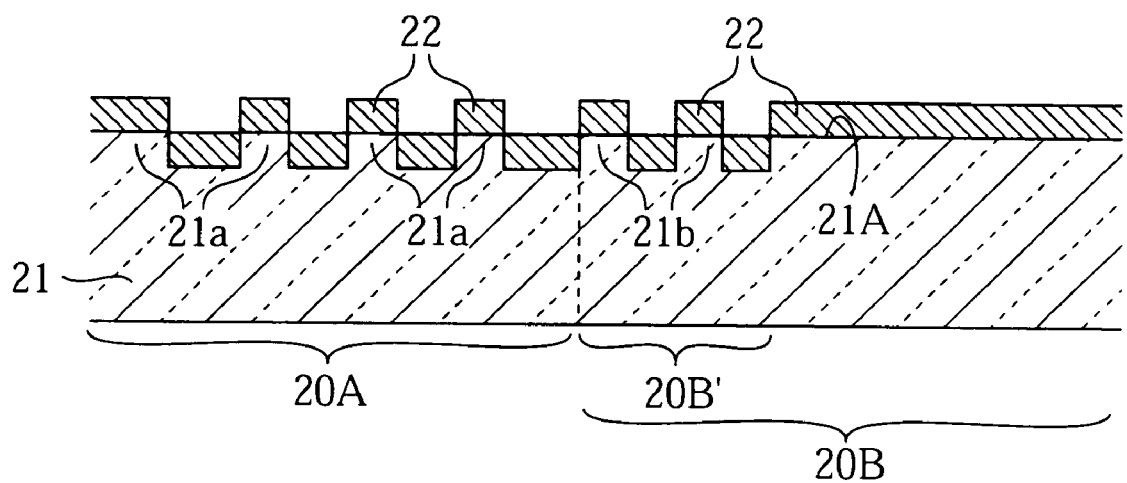
FIG. 15 shows a modified example of the magnetic transfer master according to the second embodiment.

As shown in FIG. 15, the master X2 may be provided with a thermal buffer region 20B' at the boundary of the user data zone corresponding part 20B with the servo zone corresponding part 20A. In the illustrated example, a thermal buffer pattern 21b is provided at the first surface 21A of the base 21 for the thermal buffer region 20B'. The thermal buffer pattern 21b has an uneven shape for generating the irradiated light diffraction in cases where light (laser) irradiation is executed from the side of the base 21 toward the magnetic material layer 22. With such a thermal buffer region 20B', a temperature rise at the boundary of the user data zone 102B of the magnetic recording layer 102 with the servo zone 102A is suppressed in the light irradiation step of the formatting method above, and, as a result, the transmission of heat from the user data zone 102B to servo data zone 102A is suppressed. Accordingly, it is possible to heat the user data zone 102B to a higher temperature in the light irradiation step than when no thermal buffer region is provided.

Figure 16:
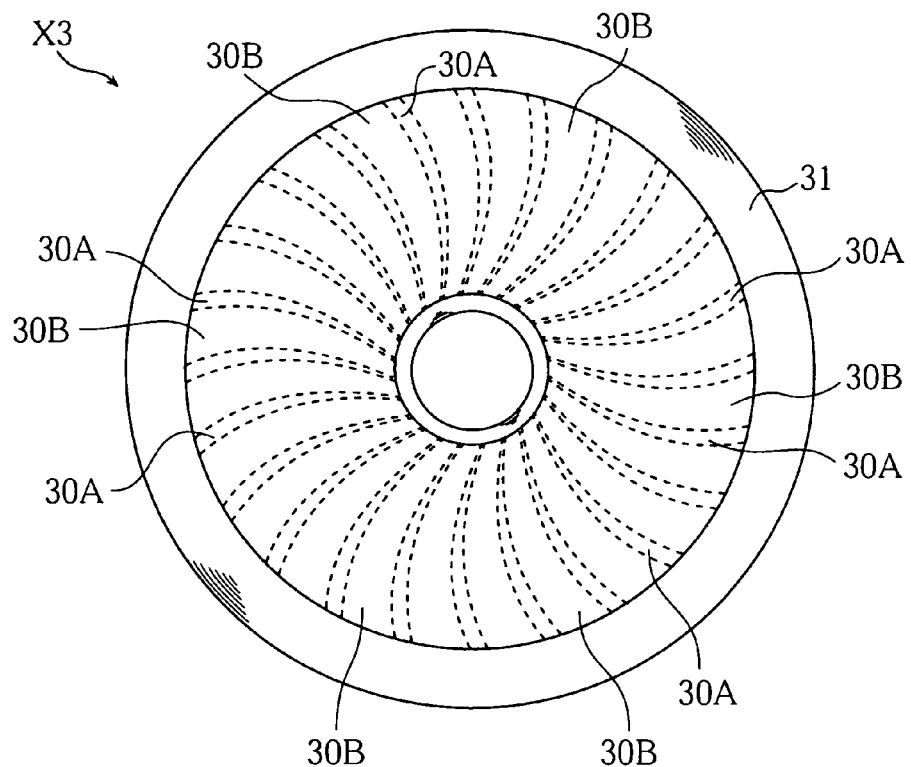
FIG. 16 is a plan view of the magnetic transfer master according to a third embodiment of the present invention.
Figure 17:
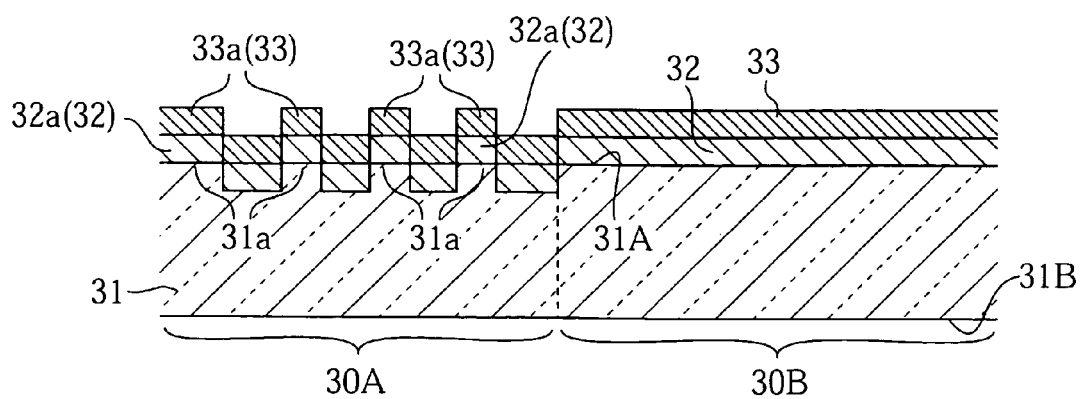
FIG. 17 is a partial cross-sectional view of the magnetic transfer master according to the third embodiment.

FIGS. 16 and 17 show a magnetic transfer master X3 according to a third embodiment of the present invention. FIG. 16 is a plan view of the master X3 and FIG. 17 is a partial cross-sectional view of the master X3.

As shown in FIG. 16, the master X3 is divided into a plurality of servo zone corresponding parts 30A and a plurality of user data zone corresponding parts 30B and has a laminated structure that is formed from a base 31, a low reflection layer 32, and a magnetic material layer 33, as shown in FIG. 17. Each of the servo zone corresponding parts 30A is a part for forming a servo zone of the magnetic disk to be fabricated. Each of the user data zone corresponding parts 30B is a part corresponding to user data zones that are formed between the servo zones of the magnetic disk to be fabricated.

The base 31 is a transparent substrate with a disk shape that is larger than the magnetic disk to be fabricated, having a first surface 31A and a second surface 31B. The first and second surfaces 31A and 31B extend across the servo zone corresponding part 30A and user data zone corresponding part 30B. The first surface 31A has a raised pattern 31a in the servo zone corresponding part 30A. The raised pattern 31a has a pattern shape that corresponds to predetermined servo information that is to be written to the magnetic disk. The height of the raised pattern 31a is 50 to 200 nm, for example. The base 31 is made of $SiO_2$, for example.

The low reflection layer 32 is a part for transmitting light energy to the magnetic material layer 33 efficiently by reducing, in cases where light (a laser) is irradiated from the side of the base 31, the reflection of this light toward the second surface 31B of the base 31. The low reflection layer 32 is made of SiN (refractive index: approximately 2), for example. Supposing that the wavelength of the irradiated light of the light irradiation step of the following formatting method that is performed by using the master X3 is $\lambda$ and that the refractive index of the constituent material of the low reflection layer 32 is n, the thickness of the low reflection layer 32 is set at a value equal to or approaching $\lambda (2s-1)/(4n)$ [s: positive integer]. The thickness of the low reflection layer 32 is 20 to 45 nm, for example. Further, the low reflection layer 32 has a raised pattern 32a in the servo zone corresponding part 30A and is level in the user data zone corresponding part 30B. The raised pattern 32a has a pattern shape that corresponds with predetermined servo information that is to be written to the magnetic disk.

The magnetic material layer 33 is made of a soft magnetic material or a ferromagnetic material. When made of a ferromagnetic material, the magnetic material layer 33 is a magnetized vertical magnetization film with an axis of easy magnetization in a direction that is perpendicular to the film surface of the magnetic film constituting this layer. Permalloy, Ni, and FeCoNi, for example, can be adopted as a soft magnetic material. As a ferromagnetic material, FeCo and CoCr, for example, can be adopted. Further, the magnetic material layer 33 has a raised pattern 33a in the servo zone corresponding part 30A and is level in the user data zone corresponding part 30B. The raised pattern 33a has a pattern shape that corresponds to predetermined servo information that is to be written to the magnetic disk. The thickness of the magnetic material layer 33 and the height of the raised pattern 33a are each 50 to 150 nm, for example.

Figure 18A:
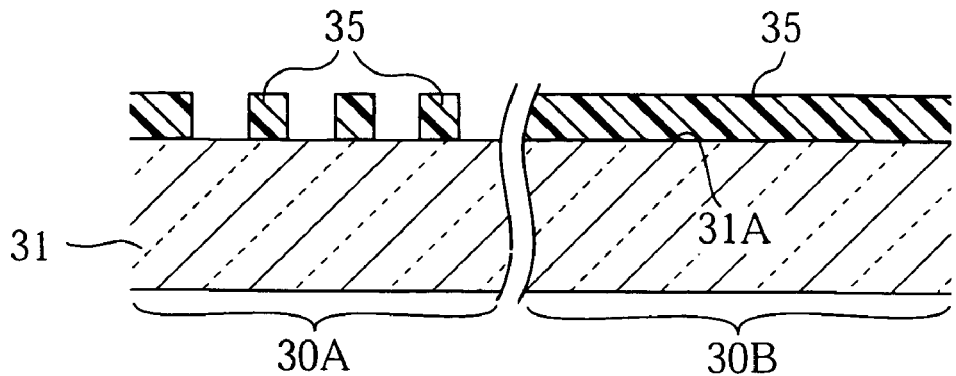
FIGS. 18A-18D show a method for fabricating the magnetic transfer master according to the third embodiment.
Figure 18B:
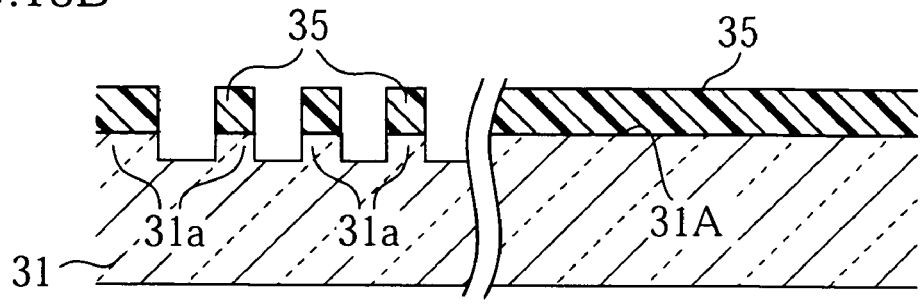
Figure 18C:
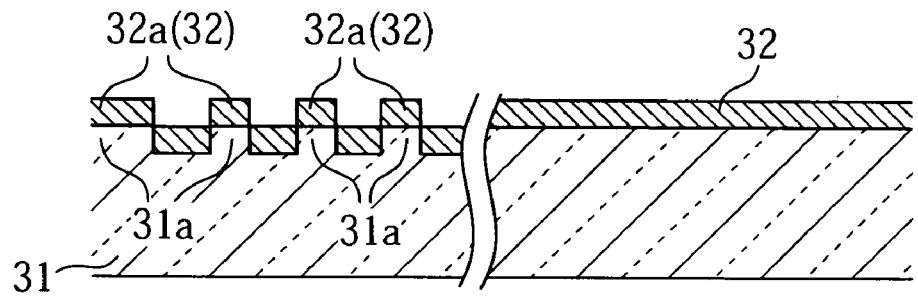
Figure 18D:
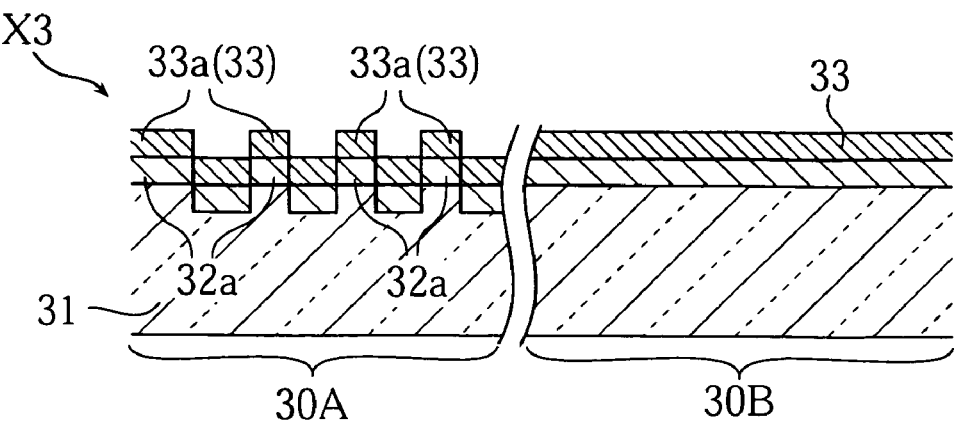

FIGS. 18A-18D show an example of a method for fabricating the master X3. In this method, as shown in FIG. 18A, a resist pattern 35 is first formed on the first surface 31A of the base 31. More specifically, a resist pattern 35 is formed by forming a resist film (an electron beam resist or photoresist) on the base 31 by spin coating and then subjecting the resist film to photographic exposure processing and development processing. Thereafter, as shown in FIG. 18B, the raised pattern 31a is formed on the first surface 31A of the base 31 by etching the base 31 with the resist pattern 35 serving as a mask. Next, the low reflection layer 32 is formed as shown in FIG. 18C following removal of the resist pattern 35. More specifically, the low reflection layer 32 is formed by depositing a predetermined material on the base 31 by sputtering, for example, following removal of the resist pattern 35 by allowing a predetermined solvent to act thereon, for example. The raised pattern 32a is formed on the low reflection layer 32 in correspondence with the uneven shape of the raised pattern 31a of the base 31. Thereafter, the magnetic material layer 33 is formed as shown in FIG. 18D. More specifically, the magnetic material layer 33 is formed by depositing a predetermined magnetic material on the low reflection layer 32 by sputtering, for example. The raised pattern 33a is formed on the magnetic recording layer 33 in correspondence with the uneven shape of the raised pattern 32a of the low reflection layer 32. The master X3 can be fabricated as detailed above.

Figure 19A:
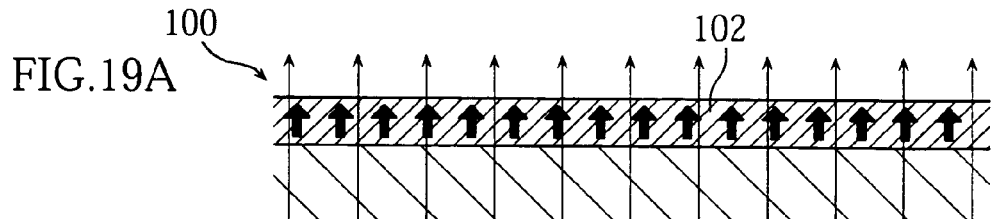
FIGS. 19A-19D show a method for formatting a vertical magnetic recording medium that is performed by using the magnetic transfer master according to the third embodiment.
Figure 19B:
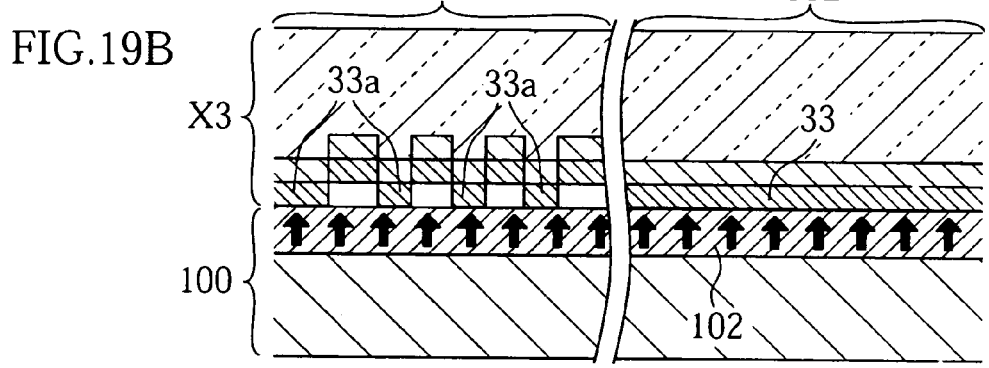
Figure 19C:
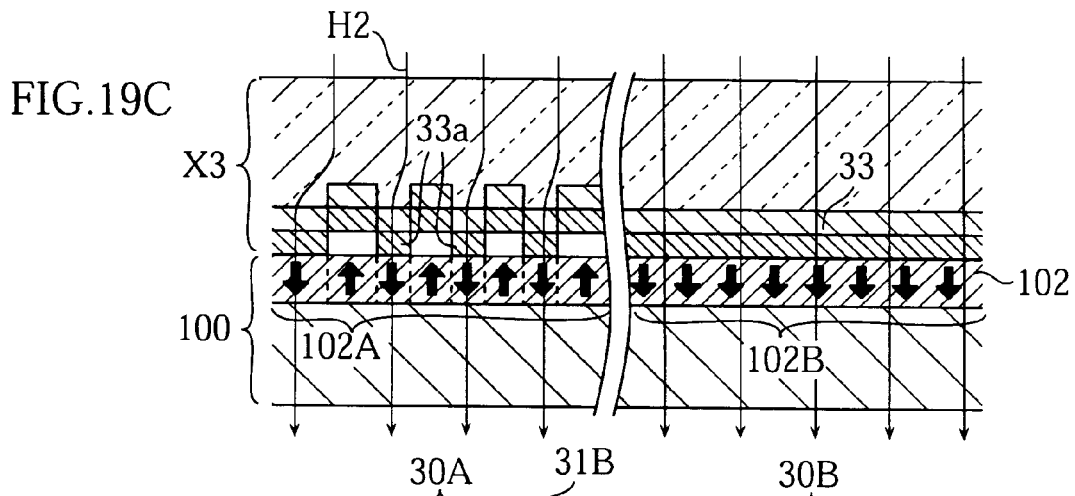
Figure 19D:
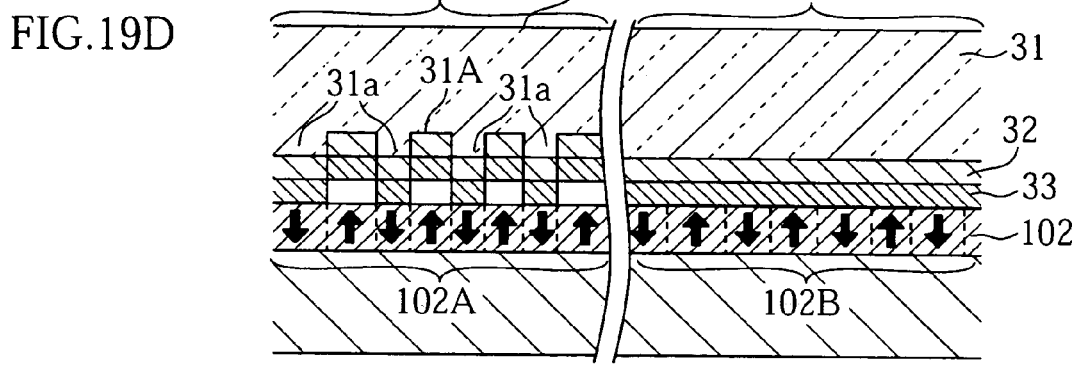

FIGS. 19A-19D show a method for formatting the magnetic recording medium 100 (shown in FIG. 7) that is performed by using the master X3. In this formatting method, first, in the initial magnetization step, the magnetic recording layer 102 is initially magnetized in the first direction by applying the initial magnetization magnetic field H1 to the magnetic recording medium 100 in the first direction as shown in FIG. 19A. With a view to simplifying the illustration, layers and films of the magnetic recording medium 100 other than the substrate 101 and magnetic recording layer 102 have been omitted from FIG. 19. Thereafter, in the overlapping step, the master X3 and the magnetic recording medium 100 are overlapped so that the raised pattern 33a of the magnetic material layer 33 and the magnetic recording layer 102 face each other, as shown in FIG. 19B. Next, in the transfer step, as shown in FIG. 19C, servo information is recorded in the magnetic recording layer 102 by magnetizing points in the magnetic recording layer 102 that face the raised pattern 33a in a second direction, which is the reverse of the first direction, by applying the transfer magnetic field H2 to the master X3 and magnetic recording medium 100 in the second direction, and points in the magnetic recording layer 102 that face the user data zone corresponding parts 30B are magnetized in the second direction. As a result of undergoing this process, the servo zones 102A and user data zones 102B are generated in the magnetic recording medium 100. Thereafter, the magnetization direction of the user data zone 102B of the magnetic recording medium 100 is rendered nonuniform as shown in FIG. 19D by irradiating light (a laser) from the side of the transparent base 31 of the master X3 toward the magnetic recording layer 33.

When light irradiation is performed from the side of the base 31 of the master X3 toward the magnetic material layer 33, in the servo zone corresponding part 30A, the diffraction phenomenon is generated at the first surface 30A on account of the uneven shape of the raised pattern 31a. The conditions for generating the diffraction phenomenon at the raised pattern 31a are the same as those mentioned for the conditions for generating the diffraction phenomenon at the raised pattern 21a of the second embodiment.

In addition, in this embodiment, the low reflection layer 32 covers the whole of the user data zone corresponding part 30B and has a raised pattern 32a in the servo zone corresponding part 30A. Therefore, the extent of the increase in the transmission efficiency of light energy to the magnetic material layer 33 caused by the reduction in the reflected light amount due to the existence of the low reflection layer 32 is greater in the user data zone corresponding part 30B than in the servo zone corresponding part 30A. Supposing that the wavelength of the irradiated light is $\lambda$, the refractive index of the low reflection layer 32 is n, and the thickness of the low reflection layer 32 is d, in the light irradiation step above, when $2nd=\lambda$ (2s−1)/2 [s: positive integer] is fulfilled, light irradiated from the side of the base 31 is not reflected at the low reflection layer 32. If light (virtual light 1) that is reflected at face (face 1) in contact with the base 31 of the low reflection layer 32 and light (virtual light 2) that passes through face 1 after being reflected at face (face 2) in contact with the magnetic material layer 33 of the low reflection layer 32 are assumed, 2nd corresponds to the so-called optical path variation of virtual light 1 and virtual light 2. In cases where a (2s−1) multiple [odd multiple] of the half wavelength λ/2 is equal to the optical path variation, the actual reflected light intensity is 0 due to interference between virtual light 1 and virtual light 2. The fact that the intensity of the reflected light is 0 means that all of the irradiated light that is the focus of attention here reaches the magnetic material layer 33 without being reflected at the low reflection layer 32. The closer the actual reflected light intensity is to zero, the smaller the amount of light reflected at the low reflection layer 32. Hence, in this embodiment, the thickness d of the low reflection layer 32 is set at a value equal to or approaching λ(2s−1)/(4n) [s: positive integer].

Owing to the combined action of the diffraction phenomenon generated in the servo zone corresponding part 30A owing to the existence of the raised pattern 31a and of the reduction in the amount of light reflected in the user data zone corresponding part 30B owing to the existence of the low reflection layer 32, the magnetic material layer 33 absorbs a larger amount of light energy and reaches a higher temperature in the user data zone corresponding part 30B than in the servo zone corresponding part 30A. The heat energy that is accumulated in the magnetic material layer 33 is transmitted to the magnetic recording layer 102 of the magnetic recording medium 100, and the user data zone 102B of the magnetic recording layer 102 rises in temperature more than the servo zone 102A. As a result, nonuniform magnetization is generated in the user data zone 102B. In this process, a temperature rise in the servo zone 102A is suppressed so that the servo information already recorded is not destroyed, while the intensity and wavelength of the irradiated light are adjusted so that nonuniform magnetization is generated in the user data zone 102B by causing the uniform magnetization in the second direction of the user data zone 102B to be disturbed by thermal fluctuations. Furthermore, in this process, a magnetic field that is weaker than the transfer magnetic field H2 may be applied in a first direction in conjunction with light irradiation.

Servo zones 102A recorded with servo information and user data zones 102B, the magnetization direction of which is nonuniform, are formed as shown in FIG. 9, for example, from the magnetic recording layer 102 through to the recording face of the magnetic recording medium 100 that has undergone such formatting. Therefore, when information tracks 110 are formed by recording predetermined data in the user data zones 102B of the magnetic recording layer 102 by a magnetic head (not illustrated) comprising a predetermined write head element, intertrack portions 111, the magnetization direction of which is nonuniform, are generated as shown in FIG. 10, for example, between the information tracks 110 of the user data zone 102B. Because the magnetization states of the intertrack portions 111 are nonuniform, the non-signal magnetic field that is formed close to the medium surface that originates in the intertrack portions 111 is weaker than the non-signal magnetic field that is formed close to the surface of the magnetic disk 200 above, for example, the magnetization direction of the intertrack portions thereof being uniform. Therefore, when the formatting method as described above that is performed by using the master X3 is adopted, it is possible to obtain a vertical magnetic recording medium that has a weak non-signal magnetic field acting on the read head element during playback. A vertical magnetic recording medium of this kind is suitable in obtaining a favorable playback characteristic.

Figure 20:
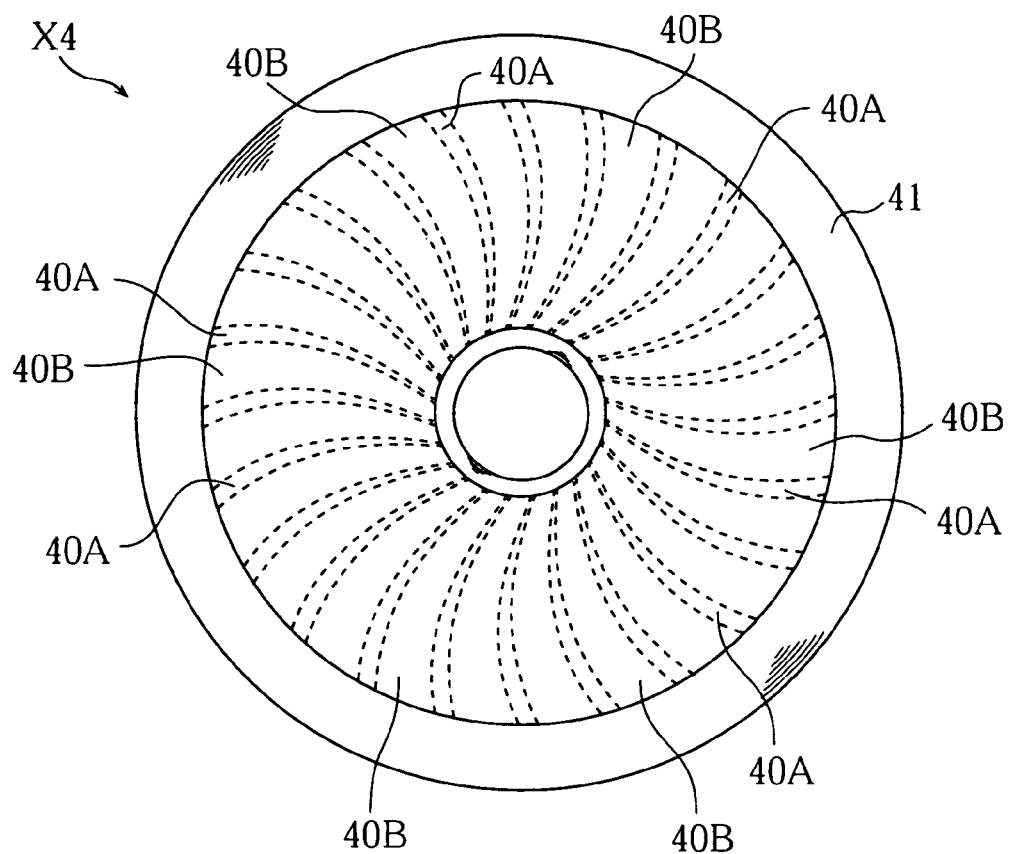
FIG. 20 is a plan view of a magnetic transfer master according to a fourth embodiment of the present invention.
Figure 21:
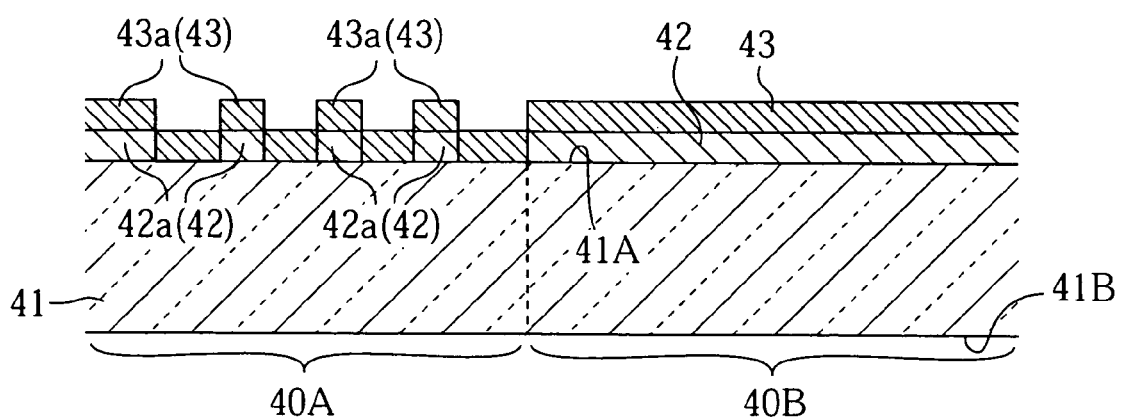
FIG. 21 is a partial cross-sectional view of the magnetic transfer master according to the fourth embodiment.

FIGS. 20 and 21 show a magnetic transfer master X4 according to a fourth embodiment of the present invention. FIG. 20 is a plan view of the master X4 and FIG. 21 is a partial cross-sectional view of the master X4.

As shown in FIG. 20, the master X4 is divided into a plurality of servo zone corresponding parts 40A and a plurality of user data zone corresponding parts 40B and has a laminated structure that is formed from a base 41, a low reflection layer 42, and a magnetic material layer 43, as shown in FIG. 21. Each of the servo zone corresponding parts 40A is a part for forming a servo zone of the magnetic disk to be fabricated. Each of the user data zone corresponding parts 40B is a part corresponding to user data zones that are formed between the servo zones of the magnetic disk to be fabricated.

The base 41 is a transparent substrate with a disk shape that is larger than the magnetic disk to be fabricated, having a first surface 41A and a second surface 41B. The first and second surfaces 41A and 41B cover the servo zone corresponding part 40A and user data zone corresponding part 40B. This kind of base 41 is made of $SiO_2$, for example.

The low reflection layer 42 has a pattern 42a in the servo zone corresponding part 40A and is level in the user data zone corresponding part 40B. The pattern 42a has a pattern shape that corresponds with predetermined servo information that is to be written to the magnetic disk. The low reflection layer 42 has a function to transmit light energy to the magnetic material layer 43 efficiently by reducing, in cases where light (a laser) is irradiated from the side of the base 41, the reflection of this light toward the second surface 41B of the base 41. This kind of low reflection layer 42 is made of SiN, for example. Supposing that the wavelength of the irradiated light of the light irradiation step of the following formatting method that is performed by using the master X4 is λ and that the refractive index of the constituent material of the low reflection layer 42 is n, the thickness of the low reflection layer 42 is set at a value that matches or approaches λ (2s−1)/(4n) [s: positive integer]. The thickness of the low reflection layer 42 is 8 to 25 nm, for example. Further, supposing that the wavelength of the irradiated light of the light irradiation step of the following formatting method that is performed by using the master X4 is λ and that the refractive index of the base 41 is n, the height of the pattern 42a is preferably λ(2k−1)/(8n) [k: positive integer] from the perspective of increasing the intensity of the reflected light in the light irradiation step.

The magnetic material layer 43 is made of a soft magnetic material or a ferromagnetic material. When made of a ferromagnetic material, the magnetic material layer 43 is a magnetized vertical magnetization film with an axis of easy magnetization in a direction that is perpendicular to the film surface of the magnetic film constituting this layer. Further, the magnetic material layer 43 has a raised pattern 43a in the servo zone corresponding part 40A and is level in the user data zone corresponding part 40B. The raised pattern 43a has a pattern shape that corresponds to predetermined servo information that is to be written to the magnetic disk. The thickness of the magnetic material layer 43 and the height of the raised pattern 43a are each 50 to 200 nm, for example.

Figure 22A:
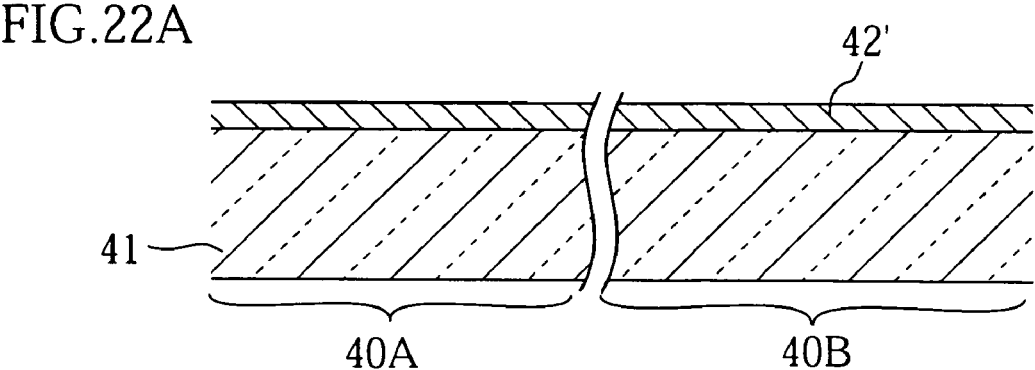
FIGS. 22A-22D show a method for fabricating the magnetic transfer master according to the fourth embodiment.
Figure 22B:
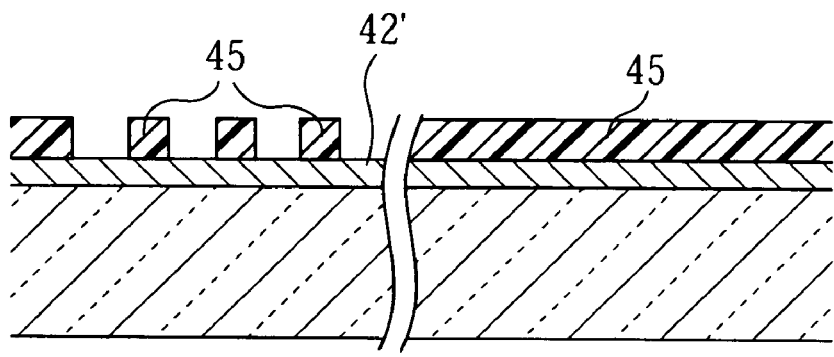
Figure 22C:
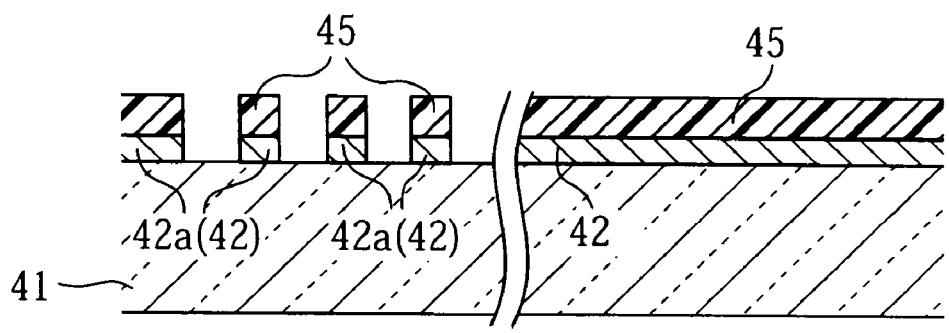
Figure 22D:
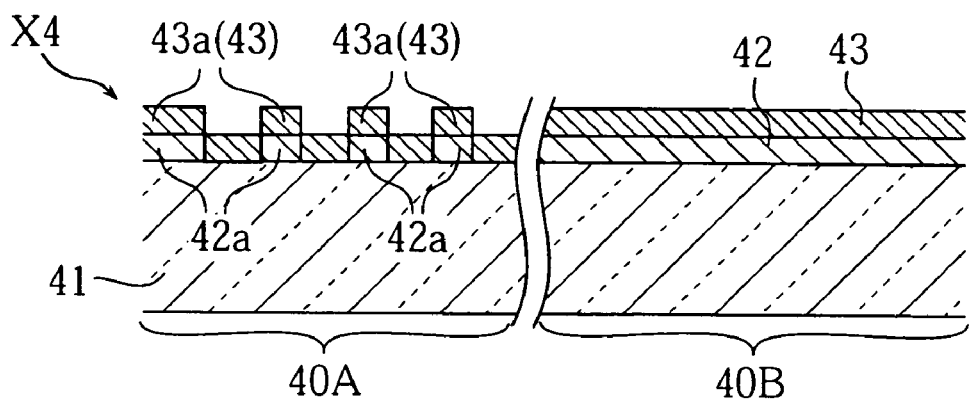

FIGS. 22A-22D show an example of a method for fabricating the master X4. In this method, as shown in FIG. 22A, a low-reflection-layer material film 42' is first formed on the base 41. More specifically, the material that is to constitute the low reflection layer 42 is deposited on the base 41 by sputtering, for example. Thereafter, as shown in FIG. 22B, a resist pattern 45 is formed on the material film 42'. More specifically, a resist pattern 45 is formed by forming a resist film (an electron beam resist or photoresist) on the material film 42' by spin coating and then subjecting the resist film to photographic exposure processing and development processing. Thereafter, as shown in FIG. 22C, the low reflection layer 42 with the pattern 42a is formed by etching the material film 42, with the resist pattern 45 serving as a mask. Next, the magnetic material layer 43 is formed as shown in FIG. 22D following removal of the resist pattern 45. More specifically, the magnetic material layer 43 is formed by depositing a predetermined magnetic material that extends over the low reflection layer 42 and base 41 by sputtering, for example, following removal of the resist pattern 45 by allowing a predetermined solvent to act thereon, for example. The raised pattern 43a is formed on the magnetic material layer 43 in correspondence with the uneven shape of the pattern 42a of the low reflection layer 42. The master X4 can be fabricated as detailed above.

Figure 23A:
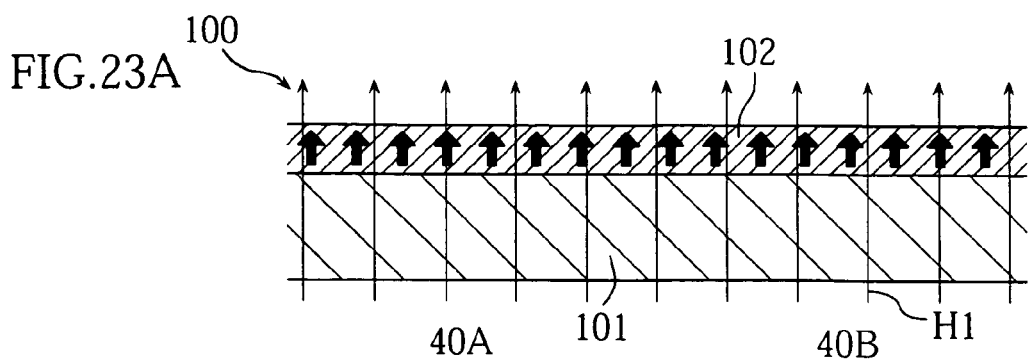
FIGS. 23A-23D show a method for formatting a vertical magnetic recording medium that is performed by using the magnetic transfer master according to the fourth embodiment.
Figure 23B:
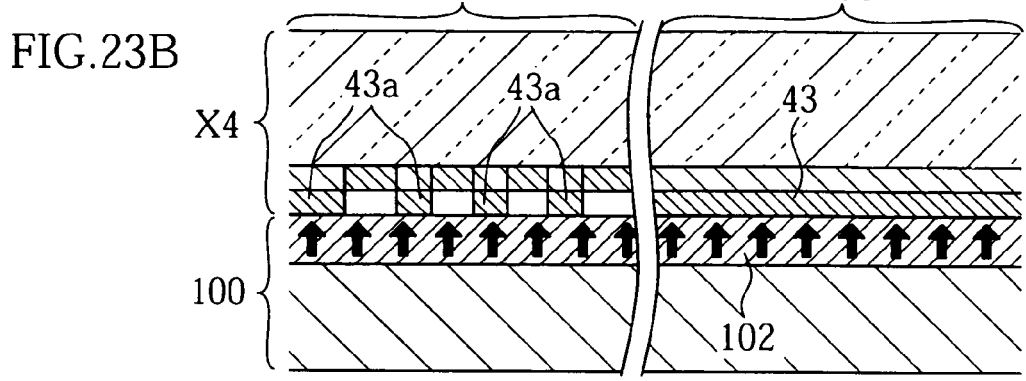
Figure 23C:
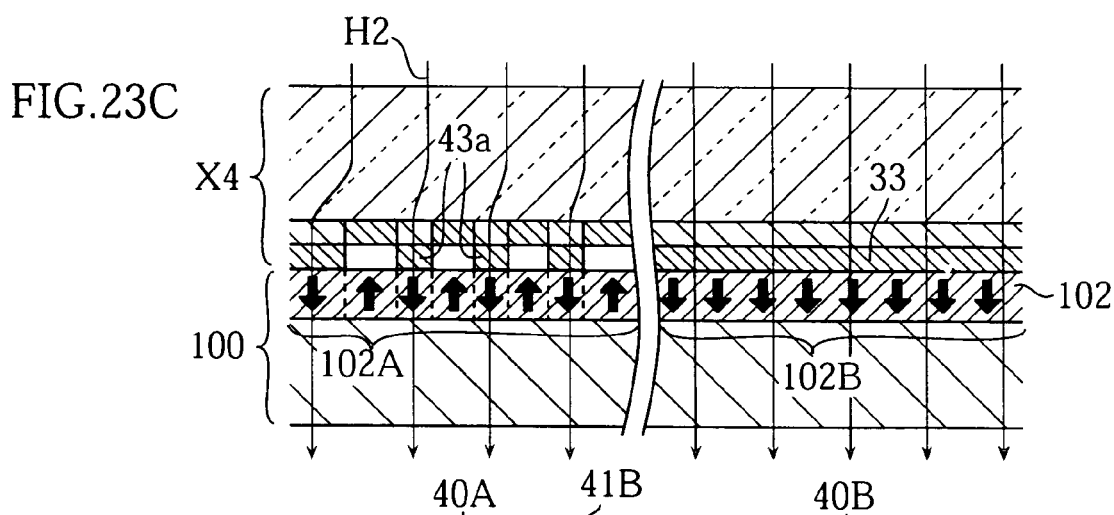
Figure 23D:
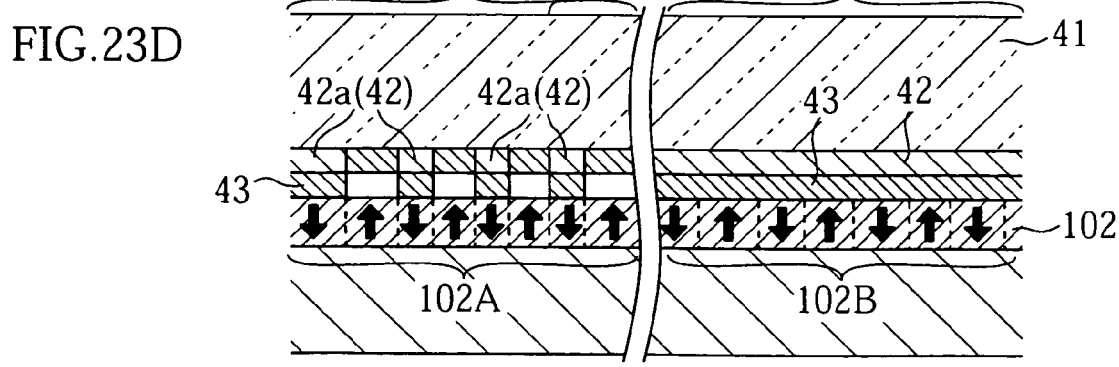

FIGS. 23A-23D show a method for formatting a magnetic recording medium 100 (shown in FIG. 7) that is performed by using the master X4. In this formatting method, first, in the initial magnetization step, the magnetic recording layer 102 is initially magnetized in a first direction by applying the initial magnetization magnetic field H1 to the magnetic recording medium 100 in the first direction as shown in FIG. 23A. With a view to simplifying the illustration, layers and films of the magnetic recording medium 100 other than the substrate 101 and magnetic recording layer 102 have been omitted from FIG. 23. Thereafter, in the overlapping step, the master X4 and the magnetic recording medium 100 are overlapped so that the raised pattern 43a of the magnetic material layer 43 and the magnetic recording layer 102 face each other, as shown in FIG. 23B. Next, in the transfer step, as shown in FIG. 23C, servo information is recorded in the magnetic recording layer 102 by magnetizing points in the magnetic recording layer 102 that face the raised pattern 43a in a second direction, which is the reverse of the first direction, by applying the transfer magnetic field H2 to the master X4 and magnetic recording medium 100 in the second direction, and points in the magnetic recording layer 102 that face the user data zone corresponding parts 40B are magnetized in the second direction. As a result of undergoing this process, the servo zones 102A and user data zones 102B are generated in the magnetic recording medium 100. Thereafter, the magnetization direction of the user data zone 102B of the magnetic recording medium 100 is rendered nonuniform as shown in FIG. 23D by irradiating light (a laser) from the side of the transparent base 41 of the master X4 toward the magnetic recording layer 43 thereof.

In this embodiment, the low reflection layer 42 covers the whole of the user data zone corresponding part 40B and has a pattern 42a in the servo zone corresponding part 40A. Therefore, the extent of the increase in the transmission efficiency of light energy to the magnetic material layer 43 caused by the reduction in the reflected light amount due to the existence of the low reflection layer 42 is greater in the user data zone corresponding part 40B than in the servo zone corresponding part 40A.

Further, in this embodiment, in the servo zone corresponding part 40A, the diffraction phenomenon can be generated on account of the uneven shape of the pattern 42a. The conditions for generating the diffraction phenomenon at the raised pattern 42a are the same as mentioned earlier for the conditions for generating the diffraction phenomenon by the raised pattern 21a of the second embodiment. More specifically, supposing that the unevenness cycle (the shortest pitch, for example) of the pattern 42a is P, the wavelength of the irradiated laser is λ, the refractive index of the pattern 42a (low reflection layer 42) is n, and the angle formed with the normal of the diffracted light (virtual lines running in parallel in the thickness direction of the pattern 42a) is θ, in the light irradiation step above, the diffraction phenomenon can be generated in accordance with the conditional expression (P×n)sin θ=m×λ [m: positive integer] in the servo zone corresponding part 40A. Because sine is equal to or less than 1 and m is equal to or more than 1, light (a laser) with the wavelength λ, which fulfills at least λ P×n must be adopted in the light irradiation step above. Due to the disparity in the height of the pattern 42a, the intensity of the light reflected toward at least the second surface 41B of the diffraction phenomenon changes, and, when it is known that a higher reflected light intensity can be obtained when the height is equal to λ(2k−1)/(8n) [k: positive integer], the height of the pattern 42a is preferably λ(2k−1)/(8n) [k: positive integer] in the present embodiment.

Due to the combined action of the reduction in the amount of light reflected in the user data zone corresponding part 40B owing to the existence of the low reflection layer 42 that covers the whole of the first surface 41A of the user data zone corresponding part 40B and to the diffraction phenomenon generated in the servo zone corresponding part 40A owing to the existence of the pattern 42a, the magnetic material layer 43 absorbs a larger amount of light energy and reaches a higher temperature in the user data zone corresponding part 40B than in the servo zone corresponding part 40A. The heat energy that is accumulated in the magnetic material layer 43 is transmitted to the magnetic recording layer 102 of the magnetic recording medium 100, and the user data zone 102B of the magnetic recording layer 102 rises in temperature more than the servo zone 102A. As a result, nonuniform magnetization is generated in the user data zone 102B. In this process, a temperature rise in the servo zone 102A is suppressed so that the servo information already recorded is not destroyed, while the intensity and wavelength of the irradiated light are adjusted so that nonuniform magnetization is generated in the user data zone 102B by causing the uniform magnetization in the second direction of the user data zone 102B to be disturbed by thermal fluctuations. Furthermore, in this process, a magnetic field that is weaker than the transfer magnetic field H2 may be applied in a first direction in conjunction with light irradiation.

Servo zones 102A recorded with servo information and user data zones 102B, the magnetization direction of which is nonuniform, are formed as shown in FIG. 9, for example, from the magnetic recording layer 102 through to the recording face of the magnetic recording medium 100 that has undergone such formatting. Therefore, when information tracks 110 are formed by recording predetermined data in the user data zones 102B of the magnetic recording layer 102 by a magnetic head (not illustrated) comprising a predetermined write head element, intertrack portions 111, the magnetization direction of which is nonuniform, are generated as shown in FIG. 10, for example, between the information tracks 110 of the user data zone 102B. Because the magnetization states of the intertrack portions 111 are nonuniform, the non-signal magnetic field that is formed close to the medium surface that originates in the intertrack portions 111 is weaker than the non-signal magnetic field that is formed close to the surface of the magnetic disk 200 above, for example, the magnetization direction of the intertrack portions thereof being uniform. Therefore, when the formatting method as described above that is performed by using the master X4 is adopted, it is possible to obtain a vertical magnetic recording medium that has a weak non-signal magnetic field acting on the read head element during playback. A vertical magnetic recording medium of this kind is suitable in obtaining a favorable playback characteristic.

Figure 24:
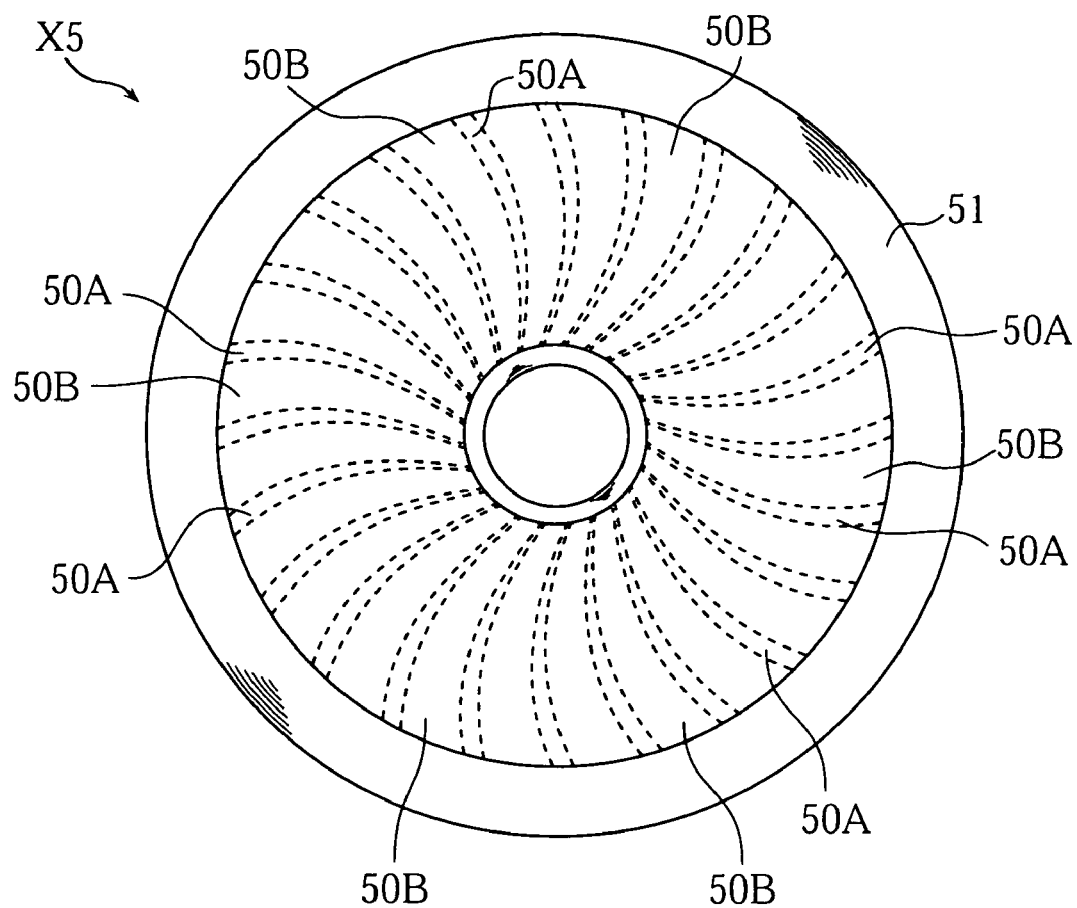
FIG. 24 is a plan view of the magnetic transfer master according to a fifth embodiment of the present invention.
Figure 25:
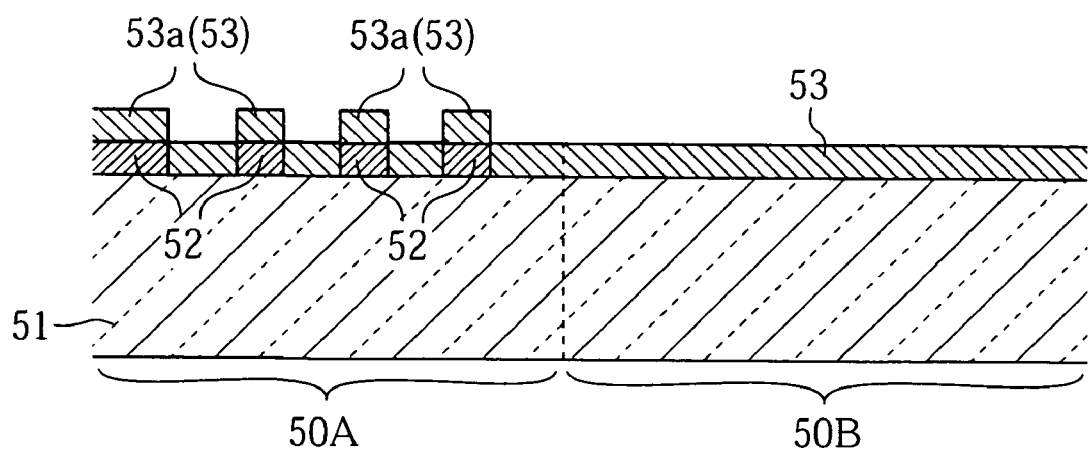
FIG. 25 is a partial cross-sectional view of the magnetic transfer master according to the fifth embodiment.

FIGS. 24 and 25 show a magnetic transfer master X5 according to a fifth embodiment of the present invention. FIG. 24 is a plan view of the master X5. FIG. 25 is a partial cross-sectional view of the master X5.

As shown in FIG. 24, the master X5 is divided into a plurality of servo zone corresponding parts 50A and a plurality of user data zone corresponding parts 50B and has a laminated structure that is formed from a base 51, a light-shielding layer 52, and a magnetic material layer 53, as shown in FIG. 24. Each of the servo zone corresponding parts 50A is a part for forming a servo zone of the magnetic disk to be fabricated. Each of the user data zone corresponding parts 50B is a part corresponding to user data zones that are formed between the servo zones of the magnetic disk to be fabricated.

The base 51 is a transparent substrate with a disk shape that is larger than the magnetic disk to be fabricated, and covers the servo zone corresponding part 50A and user data zone corresponding part 50B. This kind of base 51 is made of $SiO_2$, for example.

The light-shielding layer 52 is a part for reducing the rise in temperature of the magnetic material layer 53 in the servo zone corresponding part 50A by blocking part of the light produced when light (a laser) is irradiated from the side of the base 51 in the servo zone corresponding part 50A, and is made of Al or Ag, for example. Further, the light-shielding layer 52 has a pattern shape that corresponds with predetermined servo information that is to be written to the magnetic disk. A thickness of 10 to 20 nm, for example, for the light-shielding layer 52 suffices in obtaining an adequate light-shielding function but the thickness is preferably 50 to 200 nm from the perspective of obtaining favorable magnetic contrast between the servo zone corresponding part 50A and user data zone corresponding part 50B in the transfer step of the formatting method (described subsequently) that is performed by using the master X5.

The magnetic material layer 53 is made of a soft magnetic material or a ferromagnetic material. When made of a ferromagnetic material, the magnetic material layer 53 is a magnetized vertical magnetization film with an axis of easy magnetization in a direction that is perpendicular to the film surface of the magnetic film constituting this layer. Further, the magnetic material layer 53 has a raised pattern 53a in the servo zone corresponding part 50A and is level in the user data zone corresponding part 50B. The raised pattern 53a has a pattern shape that corresponds to predetermined servo information that is to be written to the magnetic disk. The thickness of the magnetic material layer 53 and the height of the raised pattern 53a are each 50 to 200 nm, for example.

Figure 26A:
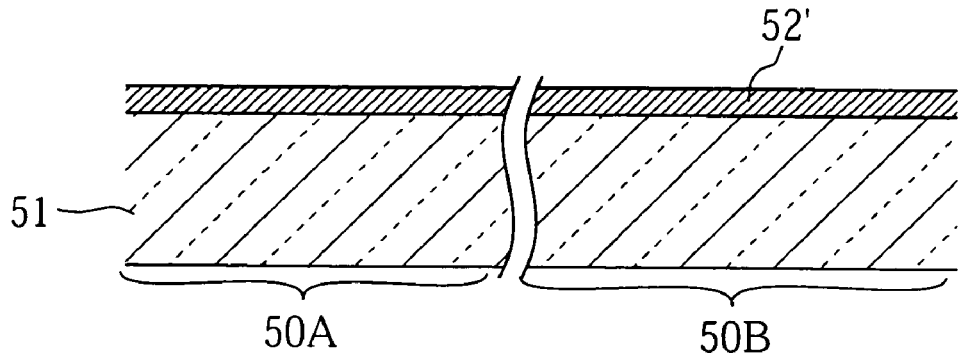
FIGS. 26A-26D show a method for fabricating the magnetic transfer master according to the fifth embodiment.
Figure 26B:
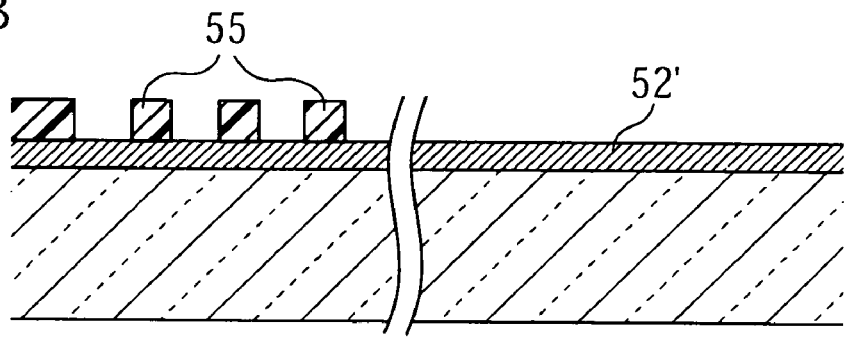
Figure 26C:
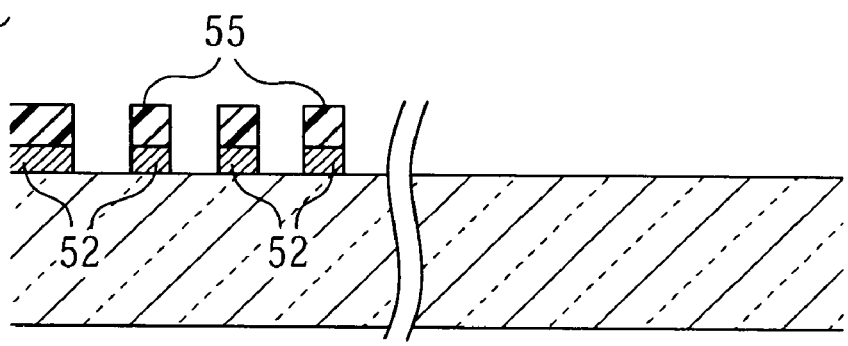
Figure 26D:
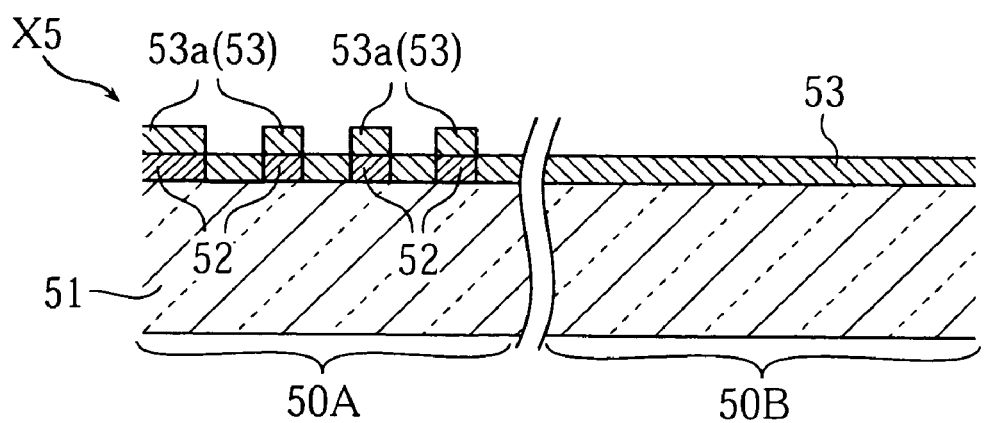

FIGS. 26A-26D show an example of a method for fabricating the master X5. In this method, as shown in FIG. 26A, a light-shielding-layer material film 52' is first formed on the base 51. More specifically, the material that is to constitute the light-shielding layer 52 is deposited on the base 51 by sputtering, for example. Thereafter, as shown in FIG. 26B, a resist pattern 55 is formed on the material film 52'. More specifically, a resist pattern 55 is formed by forming a resist film (an electron beam resist film or photoresist film) on the material film 52' by spin coating and then subjecting the resist film to photographic exposure processing and development processing. Thereafter, as shown in FIG. 26C, the light-shielding layer 52 with a predetermined pattern shape is formed by etching the material film 52' with the resist pattern 55 serving as a mask. Next, the magnetic material layer 53 is formed as shown in FIG. 26D following removal of the resist pattern 55. More specifically, the magnetic material layer 53 is formed by depositing a predetermined magnetic material that extends over the low reflection layer 52 and base 51 by sputtering, for example, following removal of the resist pattern 55 by allowing a predetermined solvent to act thereon, for example. The raised pattern 53a is formed on the magnetic material layer 53 in correspondence with the pattern shape of the light-shielding layer 52. The master X5 can be fabricated as detailed above.

Figure 27A:
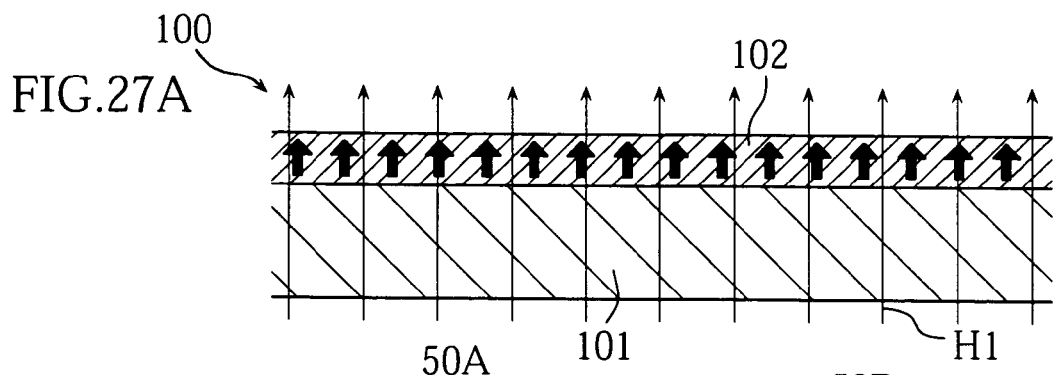
FIGS. 27A-27D show a method for formatting a vertical magnetic recording medium that is performed by using the magnetic transfer master according to the fifth embodiment.
Figure 27B:
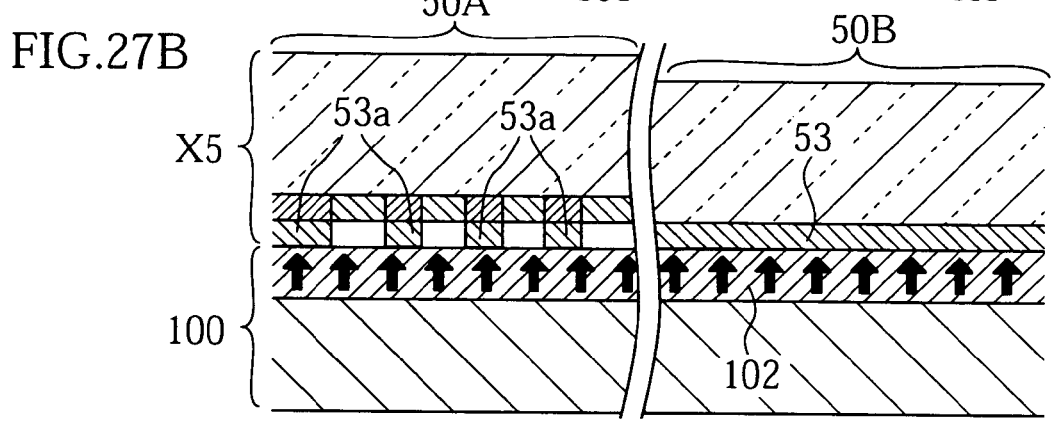
Figure 27C:
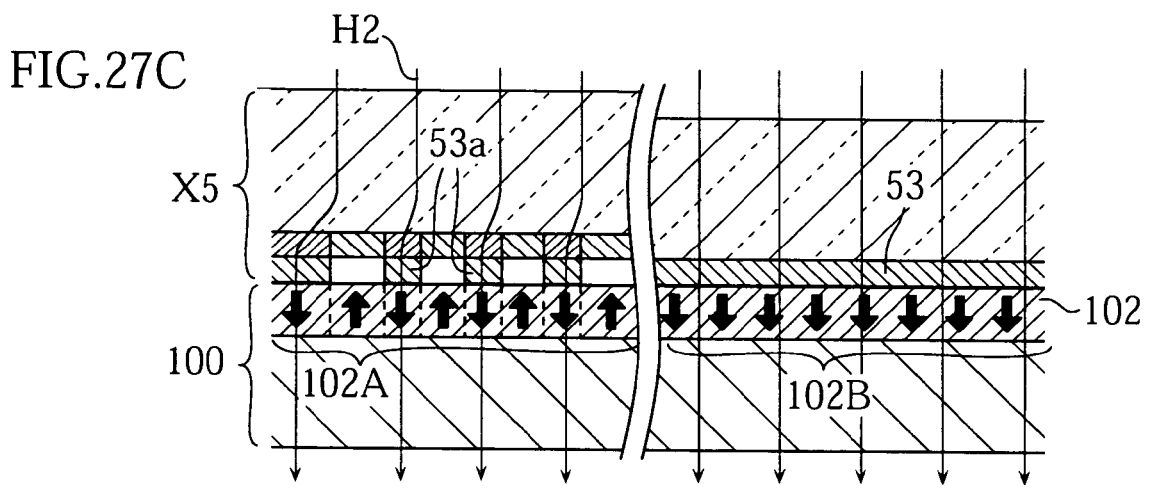
Figure 27D:
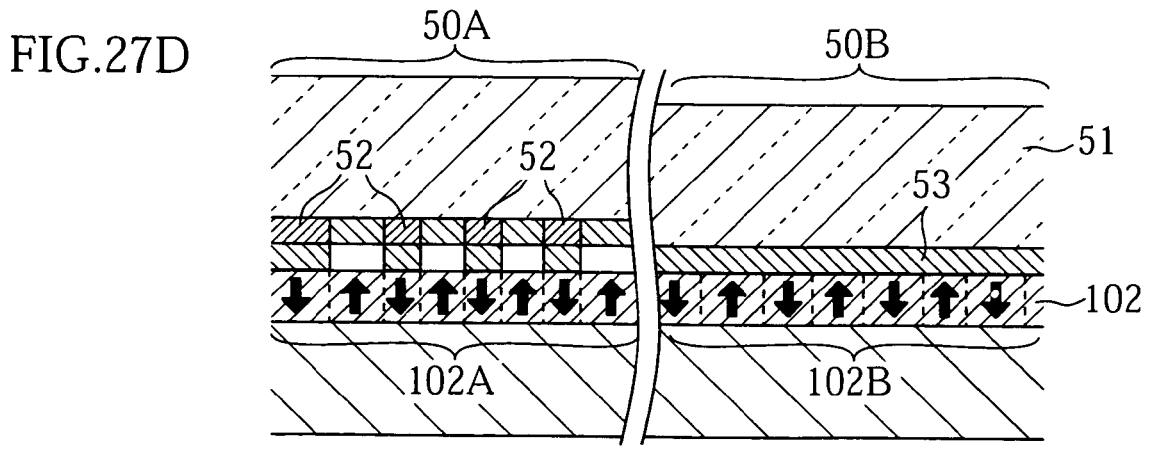

FIGS. 27A-27D show a method for formatting a magnetic recording medium 100 (shown in FIG. 7) that is performed by using the master X5. In this formatting method, first, in the initial magnetization step, the magnetic recording layer 102 is initially magnetized in the first direction by applying the initial magnetization magnetic field H1 to the magnetic recording medium 100 in the first direction as shown in FIG. 27A. With a view to simplifying the illustration, layers and films of the magnetic recording medium 100 other than the substrate 101 and magnetic recording layer 102 have been omitted from FIG. 27. Thereafter, in the overlapping step, the master X5 and the magnetic recording medium 100 are overlapped so that the raised pattern 53a of the magnetic material layer 53 and the magnetic recording layer 102 face each other, as shown in FIG. 27B. Next, in the transfer step, as shown in FIG. 27C, servo information is recorded in the magnetic recording layer 102 by magnetizing points in the magnetic recording layer 102 that face the raised pattern 53a in a second direction, which is the reverse of the first direction, by applying the transfer magnetic field H2 to the master X5 and magnetic recording medium 100 in the second direction, and points in the magnetic recording layer 102 that face the user data zone corresponding parts 50B are magnetized in the second direction. As a result of undergoing this process, the servo zones 102A and user data zones 102B are generated in the magnetic recording medium 100. Thereafter, the magnetization direction of the user data zone 102B of the magnetic recording medium 100 is rendered nonuniform as shown in FIG. 27D by irradiating light (a laser) from the side of the transparent base 51 of the master X5 toward the magnetic recording layer 53.

When light irradiation is performed from the side of the base 51 of the master X5 toward the magnetic material layer 53, because the light-shielding layer 52 exists in the servo zone corresponding part 50A, the density of the light irradiated onto the magnetic material layer 53 is higher in the user data zone corresponding part 50B than in the servo zone corresponding part 50A. For this reason, the magnetic recording layer 53 absorbs a larger amount of light energy and reaches a higher temperature in the user data zone corresponding part 50B than in the servo zone corresponding part 50A. The heat energy that is accumulated in the magnetic material layer 53 is transmitted to the magnetic recording layer 102 of the magnetic recording medium 100, and the user data zone 102B of the magnetic recording layer 102 rises in temperature more than the servo zone 102A. As a result, nonuniform magnetization is generated in the user data zone 102B. In this process, a temperature rise in the servo zone 102A is suppressed so that the servo information already recorded is not destroyed, while the intensity and wavelength of the irradiated light are adjusted so that nonuniform magnetization is generated in the user data zone 102B by causing the uniform magnetization in the second direction of the user data zone 102B to be disturbed by thermal fluctuations. Furthermore, in this process, a magnetic field that is weaker than the transfer magnetic field H2 may be applied in a first direction in conjunction with light irradiation.

Servo zones 102A recorded with servo information and user data zones 102B, the magnetization direction of which is nonuniform, are formed as shown in FIG. 9, for example, from the magnetic recording layer 102 through to the recording face of the magnetic recording medium 100 that has undergone such formatting. Therefore, when information tracks 110 are formed by recording predetermined data in the user data zones 102B of the magnetic recording layer 102 by a magnetic head (not illustrated) comprising a predetermined write head element, intertrack portions 111, the magnetization direction of which is nonuniform, are generated as shown in FIG. 10, for example, between the information tracks 110 of the user data zone 102B. Because the magnetization states of the intertrack portions 111 are nonuniform, the non-signal magnetic field that is formed close to the medium surface that originates in the intertrack portions 111 is weaker than the non-signal magnetic field that is formed close to the surface of the magnetic disk 200 above, for example, the magnetization direction of the intertrack portions thereof being uniform. Therefore, when the formatting method as described above that is performed by using the master X5 is adopted, it is possible to obtain a vertical magnetic recording medium that has a weak non-signal magnetic field acting on the read head element during playback. A vertical magnetic recording medium of this kind is suitable in obtaining a favorable playback characteristic.

Figure 28:
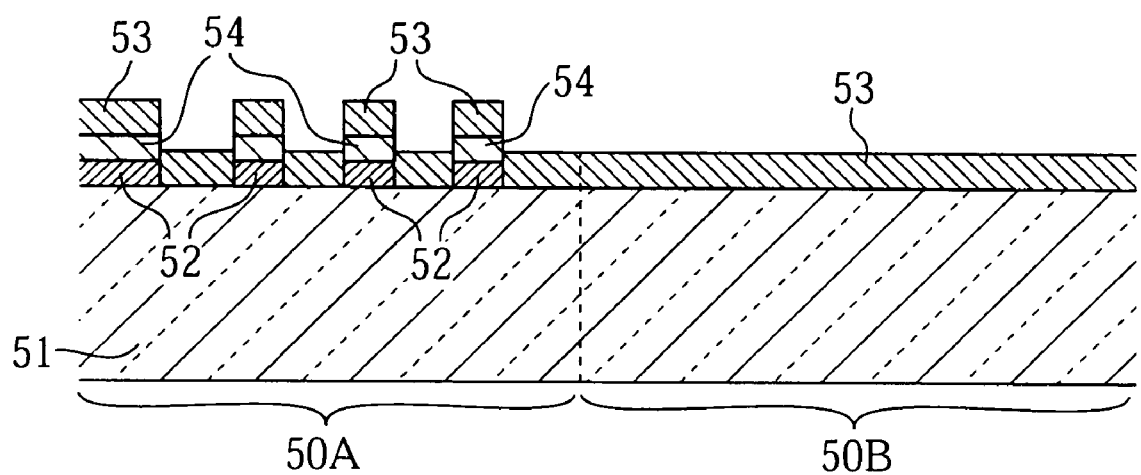
FIG. 28 shows a modified example of the magnetic transfer master according to the fifth embodiment of the present invention.
Figure 29:
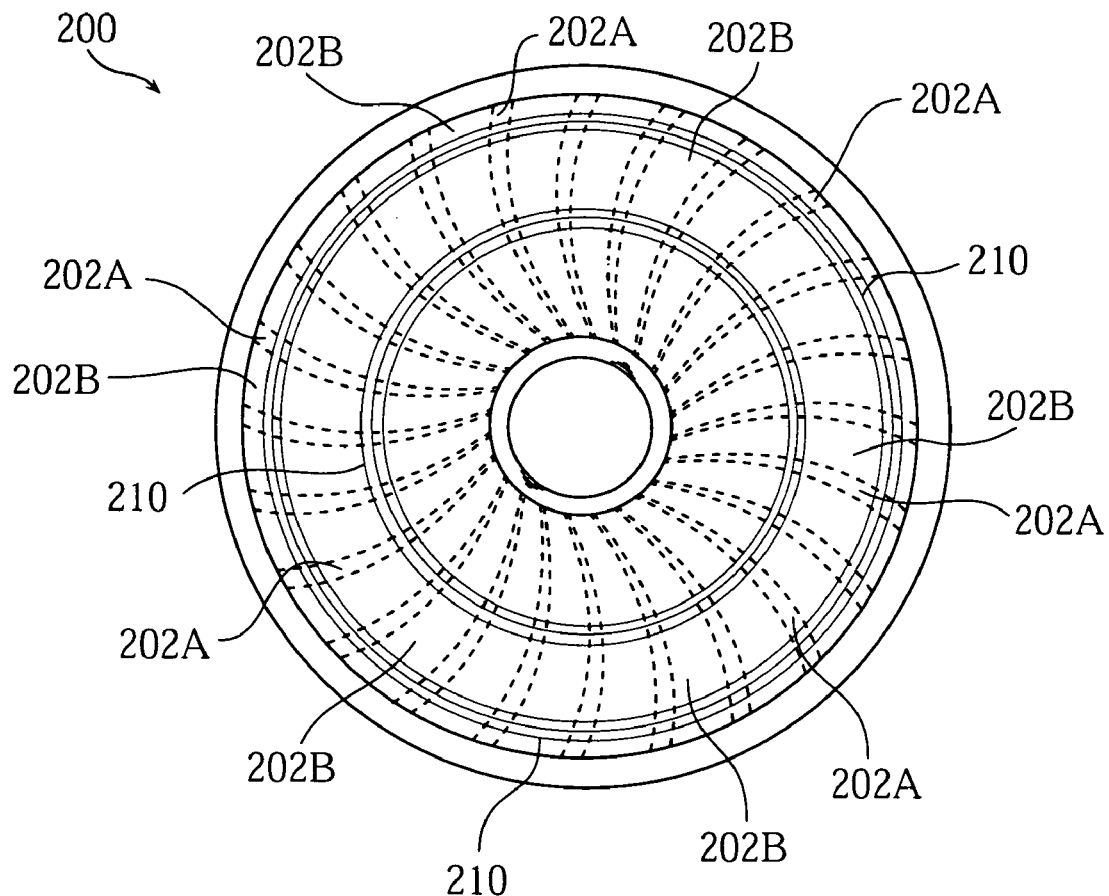
FIG. 29 is a plan view of an example of a vertical magnetic recording medium.
Figure 30:
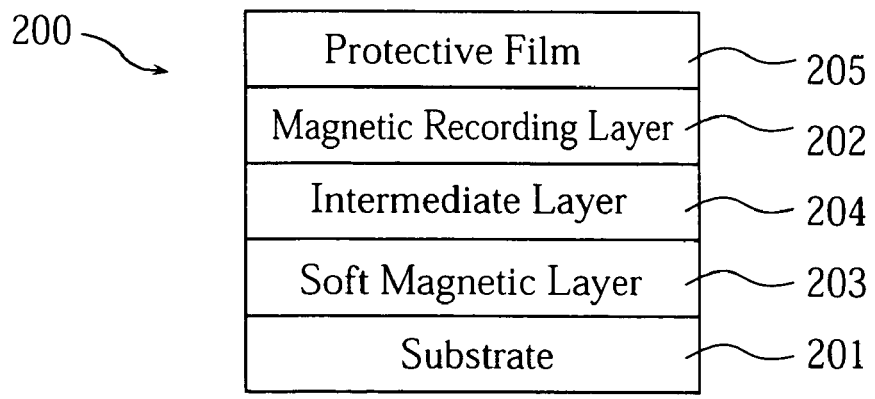
FIG. 30 shows the laminated constitution of an example of a vertical magnetic recording medium.
Figure 31A:
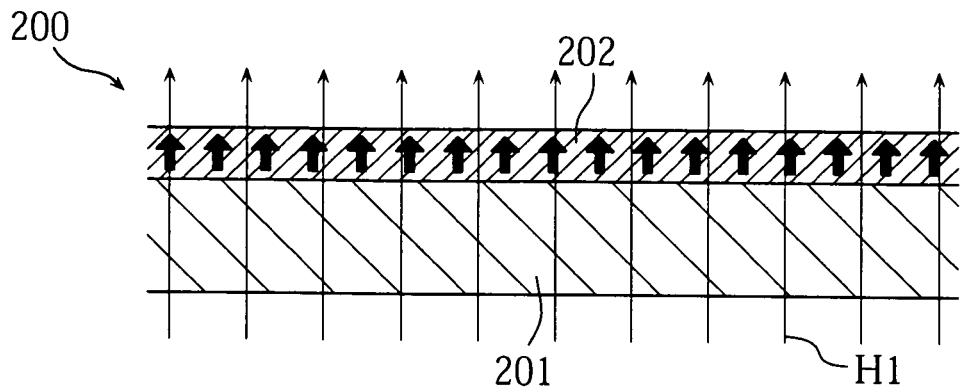
FIGS. 31A-31C show a series of steps in a case where servo information is recorded by a conventional magnetic transfer method in the magnetic disk fabrication process.
Figure 31B:
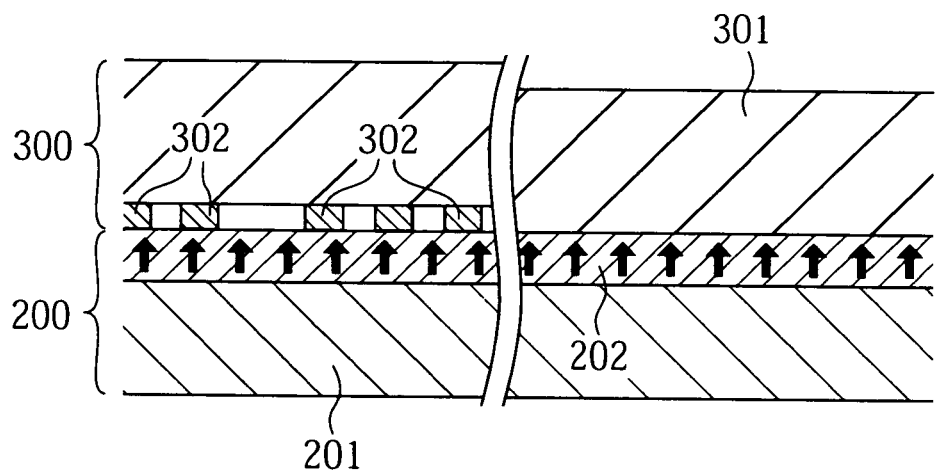
Figure 31C:
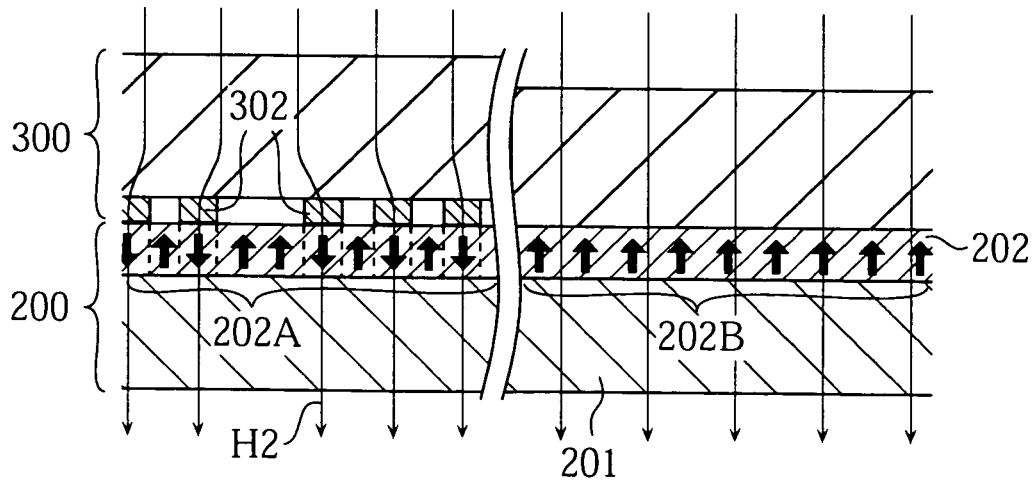
Figure 32:
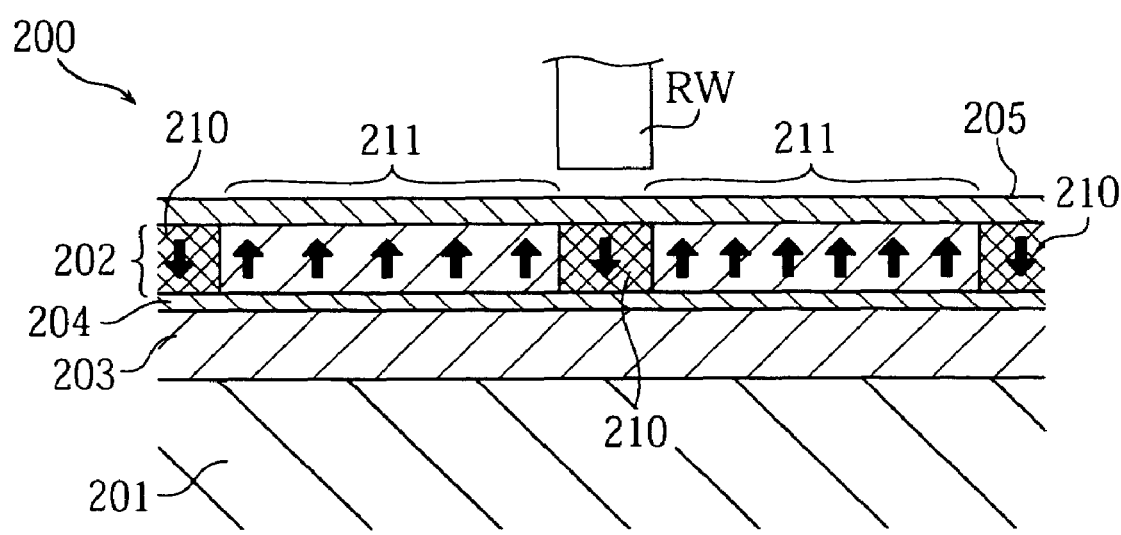
FIG. 32 is a partial cross-sectional view of a conventional vertical magnetic recording medium after data recording.

As shown in FIG. 28, the master X5 may be provided with a thermal barrier layer 54 between the light-shielding layer 52 and magnetic material layer 53. The thermal barrier layer 54 is made of a material with lower thermal conductivity than the light-shielding layer 52. As the constituent material of the thermal barrier layer 54, $SiO_2$, for example, can be adopted. In cases where the thickness of the light-shielding layer 52 is 10 to 20 nm, the thickness of the thermal barrier layer 54 is 40 to 190 nm, for example, from the perspective of obtaining a favorable magnetic contrast between the servo zone corresponding part 50A and user data zone corresponding part 50B in the transfer step of the above formatting method that is performed by using the master X5.

When the master X5 is equipped with the thermal barrier layer 54, in the light irradiation step of the formatting method that is performed by using the master X5, because the light-shielding layer 52 exists in the servo zone corresponding part 50A, the density of the light irradiated onto the magnetic material layer 53 is higher in the user data zone corresponding part 50B than in the servo zone corresponding part 50A, and makes it possible to prevent thermal conduction from the light-shielding layer 52 to the raised pattern 53a of the magnetic material layer 53 in the servo zone 102A. For this reason, the magnetic material layer 53 rises in temperature in the user data zone corresponding part 50B more readily than in the servo zone corresponding part 50A. Therefore, the master X5 with the thermal barrier layer 54 is suitable in heating the user data zone 102B to a higher temperature in the light irradiation step that is performed by using the master X5.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A master for writing information to formatting a magnetic recording medium by a magnetic transfer method, the recording medium including a magnetic recording layer that possesses vertical magnetic anisotropy, the master comprising:

a servo zone corresponding part formed with a first magnetic material pattern for recording servo information to the magnetic recording layer; and a user data zone corresponding part formed with a second magnetic material pattern for providing the magnetic recording layer with a dummy signal;

wherein the magnetic recording medium is a magnetic disk and the second magnetic material pattern includes a plurality of line elements each of which extends in a direction that corresponds to a circumferential direction of the magnetic disk, the plurality of line elements being disposed side by side in a direction that corresponds to a radial direction of the magnetic disk.

2. A master for writing information to format a magnetic recording medium by a magnetic transfer method, the recording medium including a magnetic recording layer that possesses vertical magnetic anisotropy, the master comprising:

a servo zone corresponding part formed with a first magnetic material pattern for recording servo information to the magnetic recording layer; and a user data zone corresponding part formed with a second magnetic material pattern for providing the magnetic recording layer with a dummy signal;

wherein the magnetic recording medium is a magnetic disk and the second magnetic material pattern includes a plurality of line elements each of which extends in a direction that corresponds to a radial direction of the magnetic disk, the plurality of line elements being disposed side by side a direction that corresponds to a circumferential direction of the magnetic disk.

3. A master for formatting a magnetic recording medium by a magnetic transfer method, the recording medium including a magnetic recording layer that possesses vertical magnetic anisotropy, the master comprising:

a plurality of servo zone corresponding parts each formed with a first magnetic material pattern for recording servo information to the magnetic recording layer; and a plurality of user data zone corresponding parts each directly adjoining two of the servo zone corresponding parts, each of the user data zone corresponding parts being formed with a second magnetic material pattern for providing the magnetic recording layer with a dummy signal;

wherein the magnetic recording medium is a magnetic disk and the second magnetic material pattern includes a plurality of line elements each of which extends in a direction that corresponds to a circumferential direction of the magnetic disk, the plurality of line elements being disposed side by side in a direction that corresponds to a radial direction of the magnetic disk.

4. A master for formatting a magnetic recording medium by a magnetic transfer method, the recording medium including a magnetic recording layer that possesses vertical magnetic anisotropy, the master comprising:

a plurality of servo zone corresponding parts each formed with a first magnetic material pattern for recording servo information to the magnetic recording layer; and a plurality of user data zone corresponding parts each directly adjoining two of the servo zone corresponding parts, each of the user data zone corresponding parts being formed with a second magnetic material pattern for providing the magnetic recording layer with a dummy signal;

wherein the magnetic recording medium is a magnetic disk and the second magnetic material pattern includes a plurality of line elements each of which extends in a direction that corresponds to a radial direction of the magnetic disk, the plurality of line elements being disposed side by side in a direction that corresponds to a circumferential direction of the magnetic disk.

5. A method for formatting a magnetic recording medium including a magnetic recording layer that possesses vertical magnetic anisotropy, the method comprising:

an initial magnetization step for initially magnetizing the magnetic recording layer in a first direction by applying a magnetic field to the magnetic recording medium in the first direction;

an overlapping step for overlapping a master with the magnetic recording medium, the master comprising a servo zone corresponding part and a user data zone corresponding part directly adjoining the servo zone corresponding part, the servo zone corresponding part being formed with a first magnetic material pattern for recording servo information in the magnetic recording layer, the user data zone corresponding part being formed with a second magnetic material pattern for providing the magnetic recording layer with a dummy signal, the overlapping being performed so that the first magnetic material pattern of each servo zone corresponding part and the second magnetic material, pattern of the user data zone corresponding part come into facing relation to a first region and a second region of the magnetic recording layer, respectively; and a magnetic transfer step for recording servo information in the first region of the magnetic recording layer and providing the second region of the magnetic recording layer with a dummy signal by applying a transfer magnetic field to the master and the magnetic recording medium in a second direction opposite to the first direction;

wherein the magnetic recording medium is a magnetic disk and the second magnetic material pattern includes a plurality of line elements each of which extends in a direction that corresponds to a circumferential direction of the magnetic disk, the plurality of line elements being disposed side by side in a direction that corresponds to a radial direction of the magnetic disk.

6. A method for formatting a magnetic recording medium including a magnetic recording layer that possesses vertical magnetic anisotropy, the method comprising:

an initial magnetization step for initially magnetizing the magnetic recording layer in a first direction by applying a magnetic field to the magnetic recording medium in the first direction;

an overlapping step for overlapping a master with the magnetic recording medium, the master comprising a servo zone corresponding part and a user data zone corresponding part, the servo zone corresponding part being formed with a first magnetic material pattern for recording servo information in the magnetic recording layer, the user data zone corresponding part being formed with a second magnetic material pattern for providing the magnetic recording layer with a dummy signal, the overlapping being performed so that the first magnetic material pattern and the second magnetic material pattern come into facing relation to a first region and a second region of the magnetic recording layer, respectively; and a magnetic transfer step for recording servo information in the first region of the magnetic recording layer and providing the second region of the magnetic recording layer with a dummy signal by applying a transfer magnetic field to the master and the magnetic recording medium in a second direction opposite to the first direction;

wherein the magnetic recording medium is a magnetic disk and the second magnetic material pattern includes a plurality of line elements each of which extends in a direction that corresponds to a radial direction of the magnetic disk, the plurality of line elements being disposed side by side a direction that corresponds to a circumferential direction of the magnetic disk.

* * * * *